US012602773B2

(12) United States Patent
An et al.

(10) Patent No.: US 12,602,773 B2
(45) Date of Patent: Apr. 14, 2026

(54) DEEP-LEARNING-BASED T1-ENHANCED SELECTION OF LINEAR COEFFICIENTS (DL-TESLA) FOR PET/MR ATTENUATION CORRECTION

(71) Applicants: Hongyu An, St. Louis, MO (US);
Chunwei Ying, St. Louis, MO (US);
Yasheng Chen, St. Louis, MO (US)

(72) Inventors: Hongyu An, St. Louis, MO (US);
Chunwei Ying, St. Louis, MO (US);
Yasheng Chen, St. Louis, MO (US)

(73) Assignee: Washington University, St. Louis, MO (US)

( * ) Notice: Subject to any disclaimer, the term of this patent is extended or adjusted under 35 U.S.C. 154(b) by 462 days.

Patent file contains an affidavit/declaration under 37 CFR 1.130(b).

(21) Appl. No.: 17/397,982

(22) Filed: Aug. 9, 2021

(65) Prior Publication Data

US 2022/0044399 A1 Feb. 10, 2022

Related U.S. Application Data

(60) Provisional application No. 63/062,852, filed on Aug. 7, 2020.

(51) Int. Cl.
*G06T 3/40* (2024.01)
*G06T 7/00* (2017.01)

(52) U.S. Cl.
CPC .............. *G06T 7/0012* (2013.01); *G06T 3/40* (2013.01); *G06T 2207/10088* (2013.01); *G06T 2207/30016* (2013.01)

(58) Field of Classification Search
CPC ..................... G06T 7/0012; G06T 3/40; G06T 2207/10088; G06T 2207/30016
See application file for complete search history.

(56) References Cited

U.S. PATENT DOCUMENTS

| | | | |
|---|---|---|---|
| 2018/0025512 A1* | 1/2018 | Zhu | G06T 7/11 |
| | | | 382/131 |
| 2018/0174298 A1* | 6/2018 | Schadewaldt | G06T 5/007 |
| 2018/0203084 A1* | 7/2018 | An | G01R 33/5608 |
| 2018/0211419 A1* | 7/2018 | Zhu | G06T 7/337 |
| 2019/0333210 A1* | 10/2019 | Mihalef | G06T 7/0012 |
| 2020/0210767 A1* | 7/2020 | Do | G06N 3/045 |

FOREIGN PATENT DOCUMENTS

WO WO-2015175852 A1 * 11/2015 ........... A61B 5/0035

OTHER PUBLICATIONS

"Z, Jiang et al, Sub3DNet1.0: a deep-learning model for regional-scale 3D subsurface structure mapping, 8th of Jun. 2021, Geoscientific, Model Dev 14, 3421-3435" (Year: 2021).*

(Continued)

*Primary Examiner* — Andrew W Bee
*Assistant Examiner* — D J Dhooge

(57) ABSTRACT

Systems and methods for deep-learning-based T1-enhanced selection of linear attenuation coefficients (DL-TESLA) for PET/MR attenuation are described.

8 Claims, 29 Drawing Sheets
(15 of 29 Drawing Sheet(s) Filed in Color)

(56) References Cited

OTHER PUBLICATIONS

"Recurrent residual U-Net for medical image segmentation, MD Zahangir Alom, Chris Yakopcic, Mahmudul Hasan, Tarek M. Taha, Vijayan K. Asari, J. Med. Imag. 6(1), 014006 (2019), pp. 1-13" (Year: 2019).*

Andreasen, Daniel, An investigation of Methods for CT synthesis in MR-only Radiotherapy, 2017, DTU Library, edition 428, pp. 91-114 (Year: 2017).*

Hofmann, M. et al. (2008) MRI-based attenuation correction for PET/MRI: a novel approach combining pattern recognition and atlas registration. Journal of Nuclear Medicine, vol. 49, pp. 1875-1883.

Yang, X. et al. (2019) MRI-based attenuation correction for brain PET/MRI based on anatomic signature and machine learning. Phys. Med. Biol., vol. 64, pp. 025001.

Liu, F. et al. (2018) Deep learning MR imaging-based attenuation correction for PET/MR imaging. Radiology, vol. 286, No. 2, pp. 676-684.

* cited by examiner

DEEP-LEARNING-BASED T1-ENHANCED SELECTION OF LINEAR COEFFICIENTS (DL-TESLA) FOR PET/MR ATTENUATION CORRECTION

CROSS-REFERENCE TO RELATED APPLICATIONS

This application claims priority from U.S. Provisional Application Ser. 63/062,852 filed on Aug. 7, 2020, which is incorporated herein by reference in its entirety.

STATEMENT REGARDING FEDERALLY SPONSORED RESEARCH OR DEVELOPMENT

This invention was made with government support under NS082561 awarded by the National Institutes of Health. The government has certain rights in the invention.

MATERIAL INCORPORATED-BY-REFERENCE

Not applicable.

FIELD OF THE DISCLOSURE

The present disclosure generally relates to PET/MR imaging methods, and in particular the present disclosure relates to methods for selecting linear coefficients for attenuation correction during PET/MR image reconstruction.

BACKGROUND OF THE DISCLOSURE

Accurate and precise attenuation correction (AC) is critical for the inclusion of integrated positron emission tomography and magnetic resonance (PET/MR) imaging in clinical trials. To perform AC in PET/MR, a map of linear attenuation coefficients (LAC), which are related to tissue electron density, must be derived using MRI-based approaches. Current MRI-based AC methods can be categorized into three classes: 1) atlas, 2) direct imaging/segmentation, and 3) machine learning methods. Recently, deep learning approaches, a sub-class of machine learning, have demonstrated improved performance compared to previous methods.

Thus far, most deep learning-based AC methods have used MR signal intensities from T1-weighted (T1w), Dixon, ultrashort echo time (UTE), or zero echo time (ZTE) images as inputs to derive pseudo CT (pCT) images and then generate LAC maps. However, these MR signal intensities are in arbitrary units, have no direct association with electron density, and display considerable inter-subject and across-center variations. In contrast, quantitative MRI relaxation rates are related to tissue properties and may circumvent these limitations.

In addition to accuracy, the precision of a quantitative imaging method is also important for its translation to clinical trials and ultimately to clinical practice. To properly interpret the longitudinal changes observed in PET/MR, test-test repeatability of MR-based AC must be first established in order to distinguish true pathophysiological changes from measurement error due to methodology variability. The Radiological Society of North America has made extensive efforts to address this need through the formation of the Quantitative Imaging Biomarkers Alliance (QIBA) with a mission to "improve the value and practicality of quantitative imaging biomarkers by reducing variability across devices, sites, patients, and time". However, studies assessing the direct contribution of variability in AC to PET/MR test-retest repeatability are scarce.

SUMMARY

In one aspect, a system for obtaining a linear attenuation coefficient map based on at least one MR image is disclosed that includes a computing device with at least one processor and a non-volatile computer-readable memory. The non-volatile computer-readable memory contains a plurality of instructions executable on the at least one processor. The plurality of instructions are configured to receive the at least one MR image, each MR image comprising an $FA_1TE_1$ map, an $FA_2TE_2$ map, and an R1 map; transform each MR image into a pseudo-CT map using a DL-TESLA model based on the $FA_1TE_1$ map, the $FA_2TE_2$ map, and the R1 map; and transform the pseudo-CT map into the linear attenuation coefficient map using piecewise linear scaling. In some aspects, the DL-TESLA model comprises a 3D residual UNet (ResUNet). In some aspects, the piecewise linear scaling is based on empirical relationships between CT HU values and R1 values. In some aspects, the plurality of instructions is further configured to transform the pseudo-CT map into an electron density map using piecewise linear scaling.

In another aspect, a computer-implemented method for obtaining a linear attenuation coefficient map based on at least one MR image is disclosed. The method includes receiving, using the computing device, the at least one MR image, each MR image comprising an $FA_1TE_1$ map, an $FA_2TE_2$ map, and an R1 map; transforming, using the computing device, each MR image into a pseudo-CT map using a DL-TESLA model based on the $FA_1TE_1$ map, the $FA_2TE_2$ map, and the R1 map; and transforming, using the computing device, the pseudo-CT map into the linear attenuation coefficient map using piecewise linear scaling. In some aspects, the DL-TESLA model comprises a 3D residual UNet (ResUNet). In some aspects, the piecewise linear scaling is based on empirical relationships between CT HU values and R1 values. In some aspects, the plurality of instructions is further configured to transform the pseudo-CT map into an electron density map using piecewise linear scaling.

DESCRIPTION OF THE DRAWINGS

The patent or application file contains at least one drawing executed in color. Copies of this patent or patent application publication with color drawing(s) will be provided by the Office upon request and payment of the necessary fee.

Those of skill in the art will understand that the drawings, described below, are for illustrative purposes only. The drawings are not intended to limit the scope of the present teachings in any way.

Figure 1:
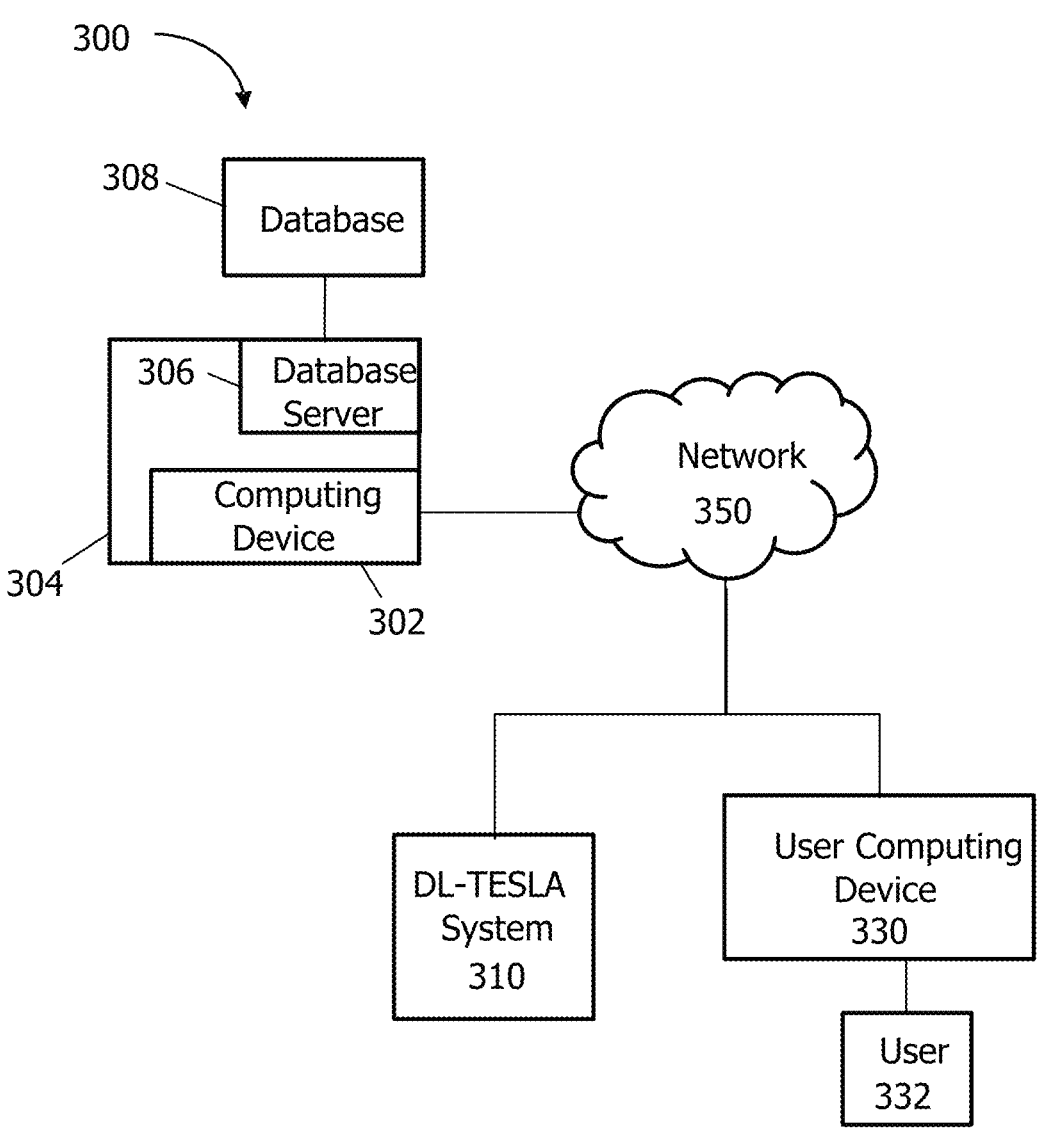
FIG. 1 is a block diagram schematically illustrating a system in accordance with one aspect of the disclosure.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

In various aspects, a 3D residual UNet (ResUNet) deep learning approach to derive pCT from MR is disclosed. The proposed method DL-TESLA method can be used for 1) PET/MR attenuation correction; 2) estimation of electron density for radiation therapy planning without using CT.

Figure 5A:
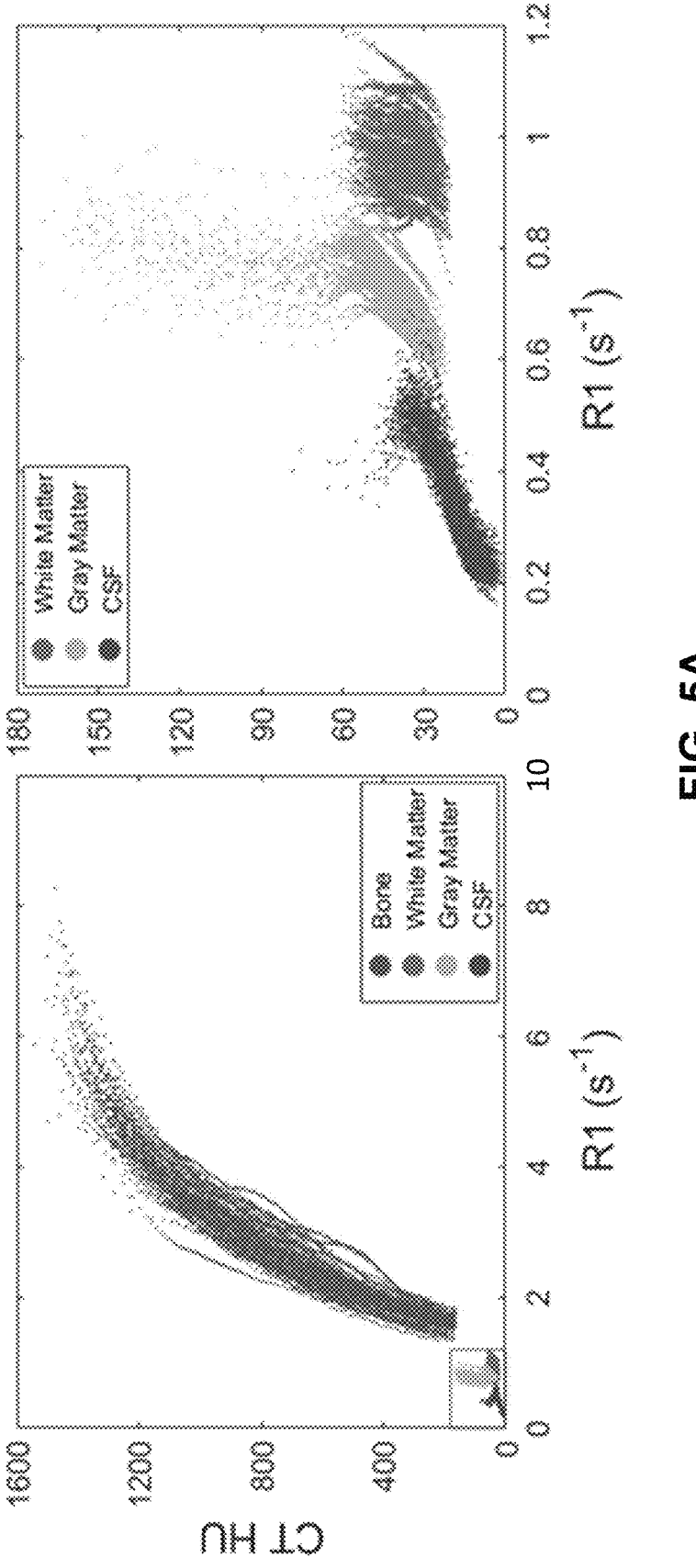
FIG. 5A contains graphs comparing UTE R1 and CT HU in bone and soft tissues (right panels: magnified insets from soft tissues).

The disclosed method of deriving pCT images and attenuation corrections is based on the discovery that longitudinal relaxation rates, or R1, derived from ultrashort echo time (UTE) imaging are associated with CT HU not only in bone but also in soft tissue, as illustrated in FIG. 5A. Without being limited to any particular theory, the inclusion of R1 maps to supplement other inputs to a deep learning model produced highly accurate MR-derived pCT.

Relaxation rates, or R2*, derived from UTE sequences display a non-linear relationship with CT Hounsfield unit (HU) in bone, but not in soft tissue. However, longitudinal relaxation rates, or R1, derived from UTE imaging are associated with CT HU not only in bone but also in soft tissue. The information contained in R1 maps derived from UTE enhances the accuracy of machine learning-based pCT methods when incorporated into the input channels of the machine learning model.

The accuracy of existing PET/MR AC methods has been limited by a lack of association between MR signal and tissue electron density. Motivated by a recent finding that longitudinal relaxation rates, or R1 values, derived from ultrashort echo time imaging are associated with CT Hounsfield units in bone and soft tissues, a Deep Learning-based T1-Enhanced Selection of Linear Attenuation Coefficients (DL-TESLA) method is disclosed that improves PET/MR AC accuracy by including quantitative R1 as an input. In one aspect, a 3D patch-based residual UNet (ResU-Net) is used to estimate pseudo CT. In this 3D ResUNet method, 3D image patches of size 64×64×64 may be used for training the ResUNet. Since the head predominantly consists of soft tissue, a random selection of patches over the entire head results in underrepresentation of air and bone regions in the training samples. Therefore, the training CT images are first thresholded into low- (HU<20), medium- (20≤HU<70), and high-CT (HU≥70) HU compartments to encompass air, soft tissue, and bone regions, respectively. Equal numbers of patches are then randomly sampled from each compartment to ensure balanced representation of low-, medium-, and high-CT HU regions in the training samples. Compared to existing deep learning methods, the disclosed method achieves significantly improved pCT and PET accuracy, as well as enhanced repeatability.

The improved performance of the disclosed method is attributed to at least two features of the disclosed method. Representations of bone, air and soft tissue are balanced in the training set used to train the 3D patch-based residual UNet (ResUNet). In addition, the methods includes R1 as an input; R1 is associated with CT HU across all tissues. In various aspects, DL-TESLA combines the patient specificity of quantitative R1 with the excellent learning capability of a state-of-the-art 3D ResUNet. It achieves highly accurate and repeatable PET/MR AC at both regional and voxel level using minimal processing time (~40 seconds) without the need for image registration. It is well-suited for longitudinal PET/MR clinical trials. The pCT derived using DL-TESLA can also be used to estimate electron density for radiation therapy planning.

Figure 14:
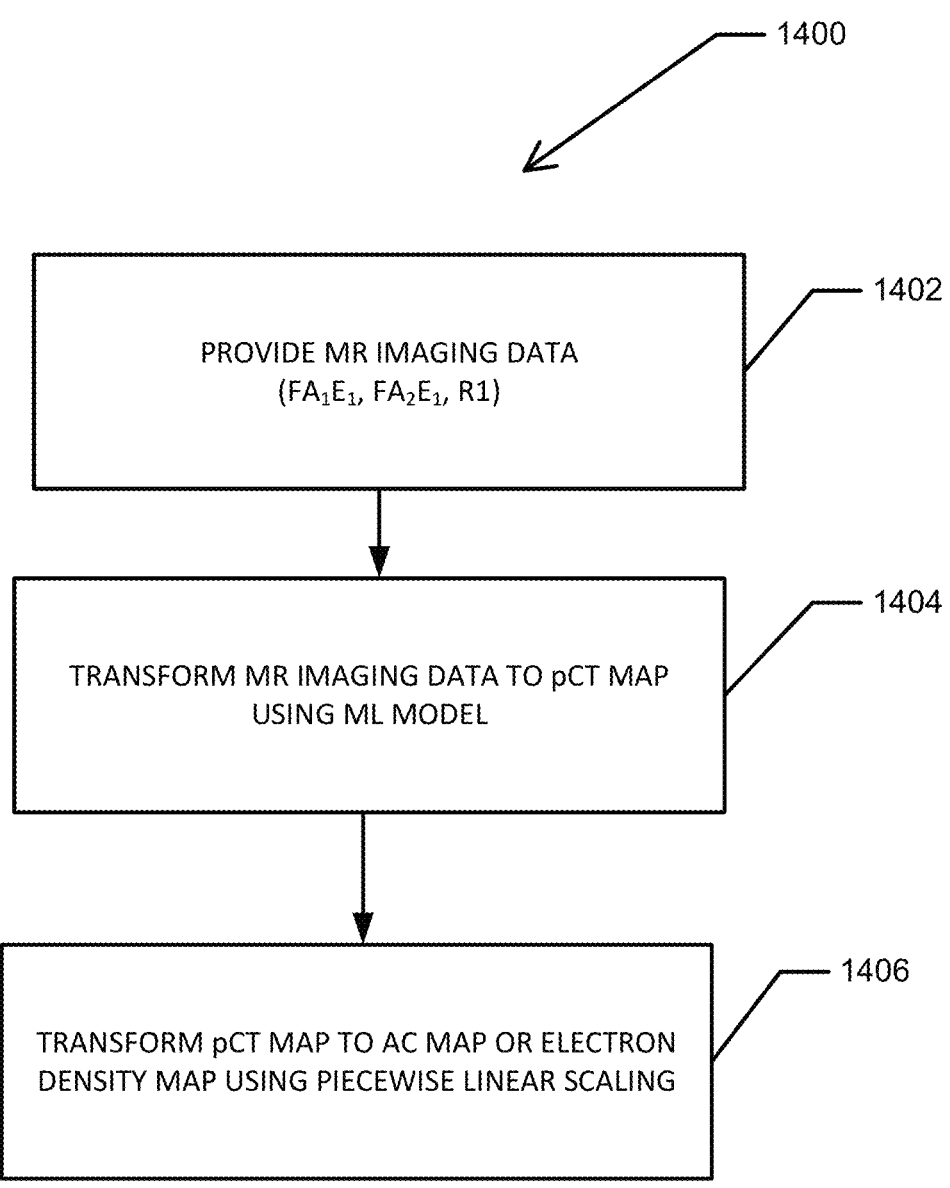
FIG. 14 is a block diagram illustrating a method of producing pCT maps using a machine learning model.

FIG. 14 is a block diagram illustrating the disclosed method 1400 of producing pCT images and attenuation coefficient maps using the DL-TESLA maching learning model. The method includes providing MR imaging data at 1402 that include FA1E1, FA2E1 images obtained using DUFA imaging methods, as well as an R1 image. The methods 1400 further includes transforming the MR imaging data to a pCT map using the machine learning model as described herein at 1404. Any machine learning model may be used without limitation including, but not limit to, the ResUNet model described herein. The method further includes transforming the pCT map to an attenuation coefficient map using piecewise linear scaling at 1406. In some aspects, the piecewise linear scaling may be based on empirically derived relationships between R1 or other MR measured parameters, and the various tissue types as described herein and illustrated in FIGS. 5A, 5B, and 5C.

Computing Systems and Devices

FIG. 1 depicts a simplified block diagram of a computing device 300 for implementing the methods described herein. As illustrated in FIG. 1, the computing device 300 may be configured to implement at least a portion of the tasks associated with disclosed method using the DL-TESLA system 310 including, but not limited to: operating the DL-TESLA system 310 to obtain MR images, transforming the MR images to pseudo-CT maps using the DL-TESLA machine learning model, and transforming the pseudo-CT maps to linear attenuation coefficients using piecewise linear scaling as described herein. The computer system 300 may include a computing device 302. In one aspect, the computing device 302 is part of a server system 304, which also includes a database server 306. The computing device 302 is in communication with a database 308 through the database server 306. The computing device 302 is communicably coupled to the DL-TESLA system 310 and a user computing device 330 through a network 350. The network 350 may be any network that allows local area or wide area communication between the devices. For example, the network 350 may allow communicative coupling to the Internet through at least one of many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. The user computing device 330 may be any device capable of accessing the Internet including, but not limited to, a desktop computer, a laptop computer, a personal digital assistant (PDA), a cellular phone, a smart-phone, a tablet, a phablet, wearable electronics, smart watch, or other web-based connectable equipment or mobile devices.

Figure 2:
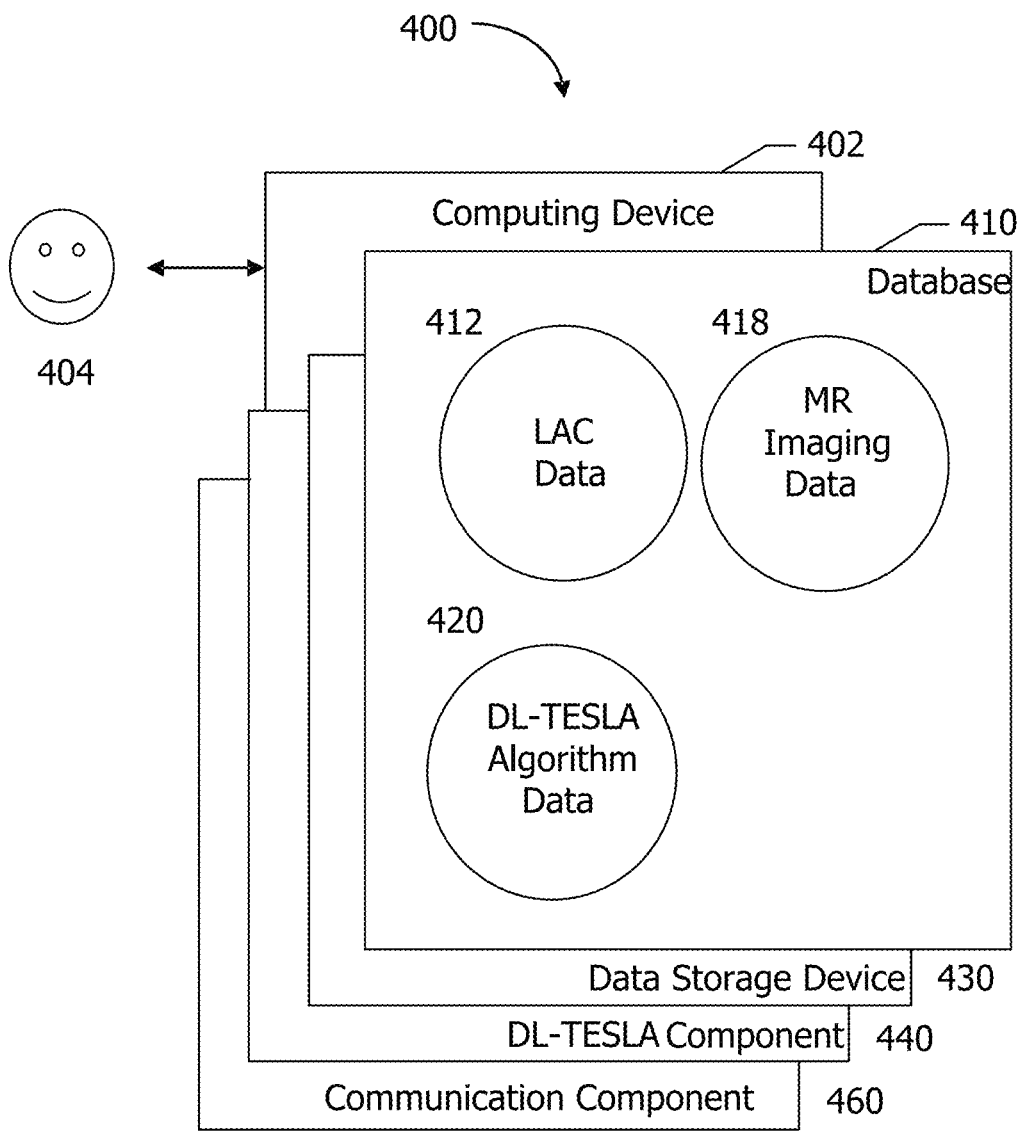
FIG. 2 is a block diagram schematically illustrating a computing device in accordance with one aspect of the disclosure.

In other aspects, the computing device 302 is configured to perform a plurality of tasks associated with transforming an MR image to a pseudo-CT map using a DL-TESLA machine learning model and transforming the p-CT map to a linear attenuation coefficient map using piecewise linear scaling as described herein. FIG. 2 depicts a component configuration 400 of computing device 402, which includes database 410 along with other related computing compo-nents. In some aspects, computing device 402 is similar to computing device 302 (shown in FIG. 1). A user 404 may access components of computing device 402. In some aspects, database 410 is similar to database 308 (shown in FIG. 1).

In one aspect, database 410 includes MR imaging data 418, DL-TESLA model data 420, and LAC data 412 defin-ing the linear attenuation coefficient maps obtained using the methods described herein. Non-limiting examples of suit-able DL-TESLA model data 420 includes any values of parameters defining the DL-TESLA machine learning model. In one aspect, the LAC data 412 may be used in a method of reconstructing PET images as described herein.

Computing device 402 also includes a number of com-ponents that perform specific tasks. In the example aspect, computing device 402 includes data storage device 430, DL-TESLA component 440, and communication compo-nent 460. Data storage device 430 is configured to store data received or generated by computing device 402, such as any of the data stored in database 410 or any outputs of processes implemented by any component of computing device 402. DL-TESLA component 440 is configured transform an MR image into a pseudo-CT image using the DL-TESLA machine learning model described herein in various aspects.

Communication component 460 is configured to enable communications between computing device 402 and other devices (e.g. user computing device 330 and DL-TESLA system 310, shown in FIG. 1) over a network, such as network 350 (shown in FIG. 1), or a plurality of network connections using predefined network protocols such as TCP/IP (Transmission Control Protocol/Internet Protocol).

Figure 3:
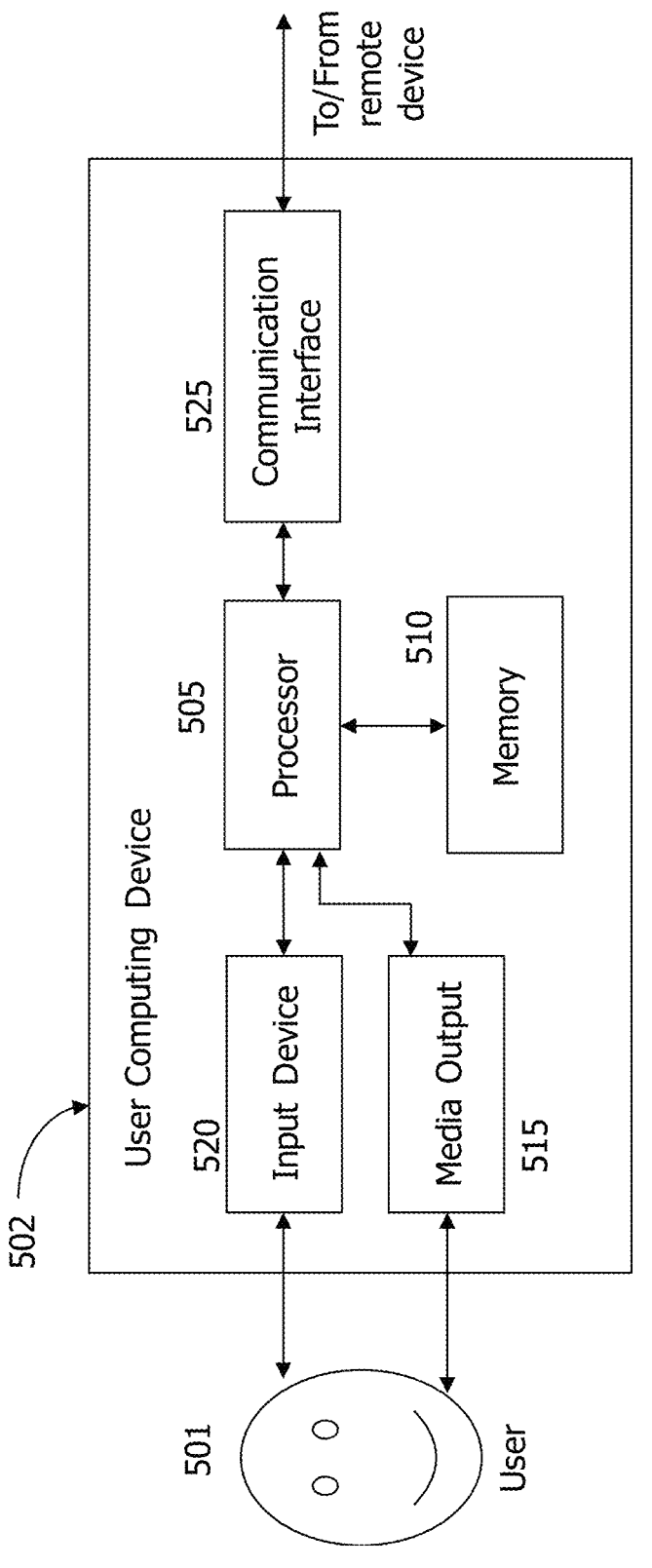
FIG. 3 is a block diagram schematically illustrating a remote or user computing device in accordance with one aspect of the disclosure.

FIG. 3 depicts a configuration of a remote or user com-puting device 502, such as user computing device 330 (shown in FIG. 1). Computing device 502 may include a processor 505 for executing instructions. In some aspects, executable instructions may be stored in a memory area 510. Processor 505 may include one or more processing units (e.g., in a multi-core configuration). Memory area 510 may be any device allowing information such as executable instructions and/or other data to be stored and retrieved. Memory area 510 may include one or more computer-readable media.

Computing device 502 may also include at least one media output component 515 for presenting information to a user 501. Media output component 515 may be any component capable of conveying information to user 501. In some aspects, media output component 515 may include an output adapter, such as a video adapter and/or an audio adapter. An output adapter may be operatively coupled to processor 505 and operatively coupleable to an output device such as a display device (e.g., a liquid crystal display (LCD), organic light emitting diode (OLED) display, cath-ode ray tube (CRT), or "electronic ink" display) or an audio output device (e.g., a speaker or headphones). In some aspects, media output component 515 may be configured to present an interactive user interface (e.g., a web browser or client application) to user 501.

In some aspects, computing device 502 may include an input device 520 for receiving input from user 501. Input device 520 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output compo-nent 515 and input device 520.

Computing device 502 may also include a communication interface 525, which may be communicatively coupleable to a remote device. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 510 are, for example, computer-readable instructions for providing a user interface to user 501 via media output component 515 and, optionally, receiv-ing and processing input from input device 520. A user interface may include, among other possibilities, a web browser and client application. Web browsers enable users 501 to display and interact with media and other information typically embedded on a web page or a website from a web server. A client application allows users 501 to interact with a server application associated with, for example, a vendor or business.

Figure 4:
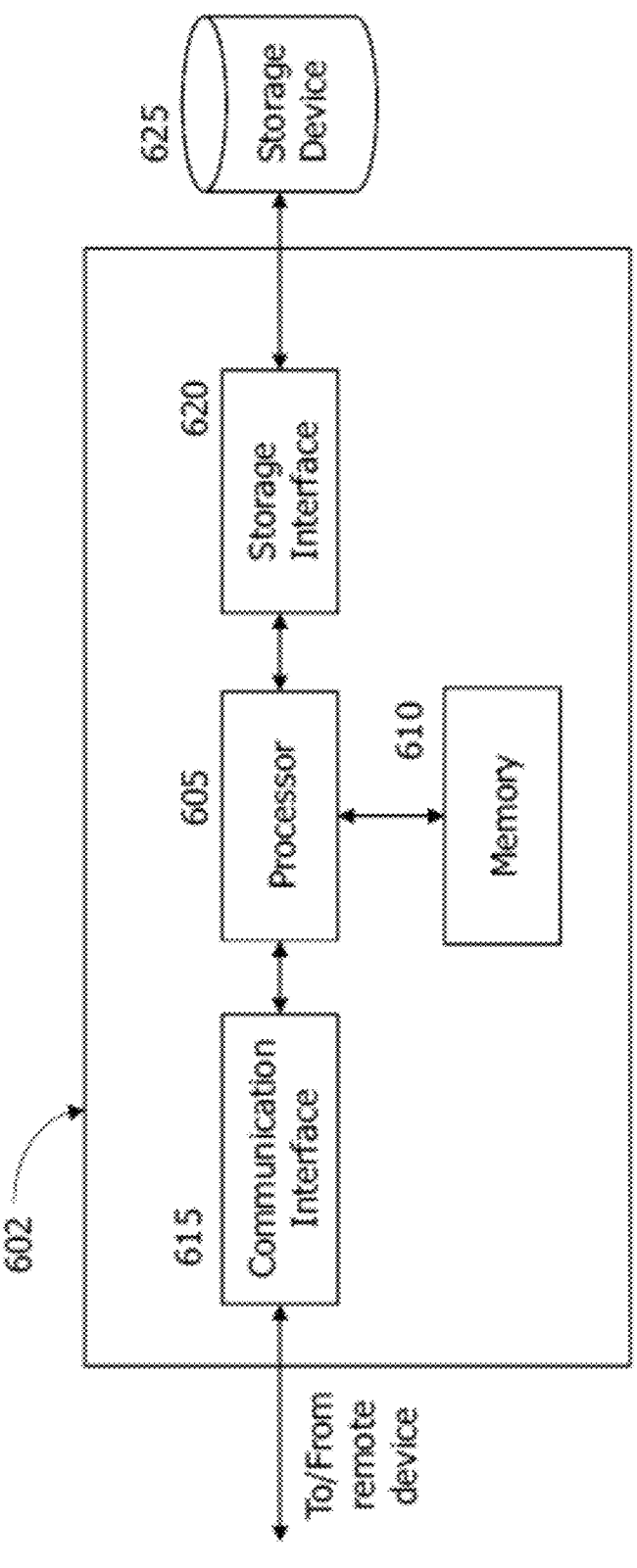
FIG. 4 is a block diagram schematically illustrating a server system in accordance with one aspect of the disclosure.

FIG. 4 illustrates an example configuration of a server system 602. Server system 602 may include, but is not limited to, database server 306 and computing device 302 (both shown in FIG. 1). In some aspects, server system 602 is similar to server system 304 (shown in FIG. 1). Server system 602 may include a processor 605 for executing instructions. Instructions may be stored in a memory area 625, for example. Processor 605 may include one or more processing units (e.g., in a multi-core configuration).

Processor 605 may be operatively coupled to a commu-nication interface 615 such that server system 602 may be capable of communicating with a remote device such as user computing device 330 (shown in FIG. 1) or another server system 602. For example, communication interface 615 may receive requests from user computing device 330 via a network 350 (shown in FIG. 1).

Processor 605 may also be operatively coupled to a storage device 625. Storage device 625 may be any com-puter-operated hardware suitable for storing and/or retriev-ing data. In some aspects, storage device 625 may be integrated in server system 602. For example, server system 602 may include one or more hard disk drives as storage device 625. In other aspects, storage device 625 may be external to server system 602 and may be accessed by a plurality of server systems 602. For example, storage device 625 may include multiple storage units such as hard disks or solid state disks in a redundant array of inexpensive disks (RAID) configuration. Storage device 625 may include a storage area network (SAN) and/or a network attached storage (NAS) system.

In some aspects, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Memory areas 510 (shown in FIG. 3) and 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and nonvolatile RAM (NVRAM). The above memory types are example only, and are thus not limiting as to the types of memory usable for storage of a computer program.

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on vehicle or mobile devices, or associated with smart infrastructure or remote servers), and/or via computer executable instructions stored on non-transitory computer-readable media or medium.

In some aspects, a computing device is configured to implement machine learning, such that the computing device "learns" to analyze, organize, and/or process data without being explicitly programmed. Machine learning may be implemented through machine learning (ML) methods and algorithms. In one aspect, a machine learning (ML) module is configured to implement ML methods and algorithms. In some aspects, ML methods and algorithms are applied to data inputs and generate machine learning (ML) outputs. Data inputs may include but are not limited to: images or frames of a video, object characteristics, and object categorizations. Data inputs may further include: sensor data, image data, video data, telematics data, authentication data, authorization data, security data, mobile device data, geolocation information, transaction data, personal identification data, financial data, usage data, weather pattern data, "big data" sets, and/or user preference data. ML outputs may include but are not limited to: a tracked shape output, categorization of an object, categorization of a type of motion, a diagnosis based on motion of an object, motion analysis of an object, and trained model parameters ML outputs may further include: speech recognition, image or video recognition, medical diagnoses, statistical or financial models, autonomous vehicle decision-making models, robotics behavior modeling, fraud detection analysis, user recommendations and personalization, game AI, skill acquisition, targeted marketing, big data visualization, weather forecasting, and/or information extracted about a computer device, a user, a home, a vehicle, or a party of a transaction. In some aspects, data inputs may include certain ML outputs.

In some aspects, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various aspects, the implemented ML methods and algorithms are directed toward at least one of a plurality of categorizations of machine learning, such as supervised learning, unsupervised learning, and reinforcement learning.

In one aspect, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function which maps outputs to inputs and utilize the predictive function to generate ML outputs based on data inputs. The example inputs and example outputs of the training data may include any of the data inputs or ML outputs described above.

In another aspect, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship.

In yet another aspect, ML methods and algorithms are directed toward reinforcement learning, which involves optimizing outputs based on feedback from a reward signal. Specifically ML methods and algorithms directed toward reinforcement learning may receive a user-defined reward signal definition, receive a data input, utilize a decision-making model to generate a ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In one aspect, a ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict a user selection.

As will be appreciated based upon the foregoing specification, the above-described aspects of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one aspect, a computer program is provided, and the program is embodied on a computer readable medium. In one aspect, the system is executed on a single computer system, without requiring a connection to a sever computer. In a further aspect, the system is being run in a Windows® environment (Windows is a registered trademark of Microsoft Corporation, Redmond, Wash.). In yet another aspect, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some aspects, the system includes multiple components distributed among a plurality of computing devices. One or more components may be in the form of computer-executable instructions embodied in a computer-readable medium. The systems and processes are not limited to the specific aspects described herein. In addition, components of each system and each process can be practiced independent and separate from other components and processes described herein. Each component and process can also be used in combination with other assembly packages and processes. The present aspects may enhance the functionality and functioning of computers and/or computer systems.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following examples illustrate various aspects of the disclosure.

Example 1: Development of DL-TESLA Model for pCT

To develop the machine learning model to obtain pCT mapping from MR imaging data, the following experiments were conducted.

Imaging data were acquired from participants (n=197) en-rolled in an ongoing neuroimaging study of memory and aging with an Institutional Review Board-approved protocol and writ-ten informed consent. These participants were separated into 2 sub-groups: group A (n=174, median age [interquartile range (IQR)]: 70 [64.25-75] years, 103 females) underwent single-time-point tri-modality imaging (PET/MR/CT), and group B (n=23, median age [IQR]: 71 [68.5-76.5] years; 11 females) underwent tri-modality imaging at 2 time points (PET1/MR1/CT1 and PET2/MR2/CT2). In group A, the median time [IQR] between CT and PET/MRI acquisition was 6 [~0.75-29.75] days. In Group B, the median time [IQR] between the same participant's first and second PET/MR (PET1/MR1 vs. PET2/MR2) and first and second CT scans (CT1 vs. CT2) were 35 [31.5-39] and 37 [31.5-39] months, respectively.

PET and MR images were acquired using an integrated Biograph mMR PET/MRI system (Siemens AG, Erlangen, Germany). CT images were acquired using a Biograph 40 PET/CT system (Siemens AG, Erlangen, Germany). 18F-Florbetapir (Amyvid [Avid], Eli Lilly, Indianapolis, Ind.) list mode PET data were acquired from all participants using an injection dose (median [IQR]) of 373.7 [362.6-385.7] MBq. MR T1-weighted images were acquired using a 3D MPRAGE sequence with the following imaging parameters: TE/TR=2.95/2300 ms, TI=900 ms, number of parti-tions=176, ma-trix size=240×256×176, voxel size=1.05× 1.05×1.2 mm3, acquisition time=5 min 11 s. In- and opp-phase Dixon images were acquired using vendor-provided standard Dixon AC scan with the following imaging param-eters: TR=3.6 ms, TE=1.23/2.46 ms, FA=10°, voxel size=2.6×2.6×3.1 mm3, acquisition time=19 s, matrix size=192×126×128. Dual flip angle and dual echo UTE (DUFA-DUTE) images were acquired using the following imaging parameters: TR=6.26 ms, TE1=0.07, TE2=2.46 ms, FA1=3°, FA2=15°, number of radial lines=18,000, matrix size=192×192×192, voxel size=1.56×1.56×1.56 mm3, acquisition time=1 min 55 s per flip angle (FA). In group B, 23 PET1/MR1 scans were acquired using different imaging parameters with a TR of 9 ms, a $TE_2$ of 3.69 ms, and an FA2 of 25°. Images were obtained from August 2014 to September 2018. During the study period, the Siemens mMR underwent an upgrade from VB20P to VE11P. This VE11P includes software and scanner computer upgrades. A total of 15 of 24 PET2/MR2 scans of group B participants were performed using a Syngo VE11P, all other PET/MR scans were acquired on a Syngo VB20P. The vendor provided product UTE sequence was modified to allow custom scan parameter selections. CT images were acquired at 120 kVp with voxel size=0.59×0.59×3.0 mm$^3$ or 0.59×0.59×2.0 mm$^3$.

The level-set segmentation tool in the Computational Morphometry Toolkit (CMTK) was used to segment the head region from the background in MR and CT images. The FMRIB's Automated Segmentation Tool (FAST) tool in the FSL Toolbox (FMRIB, Oxford, UK) was used for bias field correction.

The DUFA-DUTE signal can be described by Equation (1):

$$S(FA) = \frac{M_0 * \sin(FA) * \left(1 - e^{-\frac{TR}{TI}}\right) * e^{-\frac{TE}{T2*}}}{1 - e^{-\frac{TR}{TI}} * \cos(FA)} \quad (1)$$

where FA is the flip angle and Mo is the magnitude of the equilibrium magnetization.

Quantitative R1 was computed using Equation (2):

$$R1 = \frac{\ln\left(\frac{S(FA_2E_1)}{\tan(FA2)} - \frac{S(FA_1E_1)}{\tan(FA1)}\right) - \ln\left(\frac{S(FA_2E_1)}{\sin(FA2)} - \frac{S(FA_1E_1)}{\sin(FA1)}\right)}{TR} \quad (2)$$

where $S(FA_1E_1)$ and $S(FA_2E_1)$ are the first echo of the first and second FA signal, respectively. Moreover, quantitative R* can be computed using the dual echo UTE images.

To avoid erroneous negative $R_{2*}$ because of ADC and gradient delays in the first echo UTE images, an empirical factor of 3 was used to scale the first echo followed by an exponential fitting to estimate $R_{2*}$ as expressed in Equation (3):

$$R2^* = \frac{\ln(3 \times S(FA_2E_1)) - \ln(S(FA_2E_2))}{TE2 - TE1} \quad (3)$$

where $S(FA_2E_1)$ and $S(FA_2E_2)$ are the first and second echo UTE images with the second FA.

For each participant in group A, CT, Dixon, and T1-MPRAGE images were coregistered to the UTE images using a 12 parameter affine registration with the FMRIB's Linear Image Registration Tool (FLIRT) in the FSL tool-box.48 Similarly, visit 2 MR and CT images were also aligned to visit 1 UTE images with the same registration toolkit. In CT images, bone and air were segmented with HU greater than 200 and less than −500, respectively.

T1-MPRAGE images were segmented into gray matter, white matter, CSF, and various brain regions using Free-Surfer 5.3 (http://surfer.nmr.mgh.harva rd.edu/) for regional analysis.

Figure 5B:
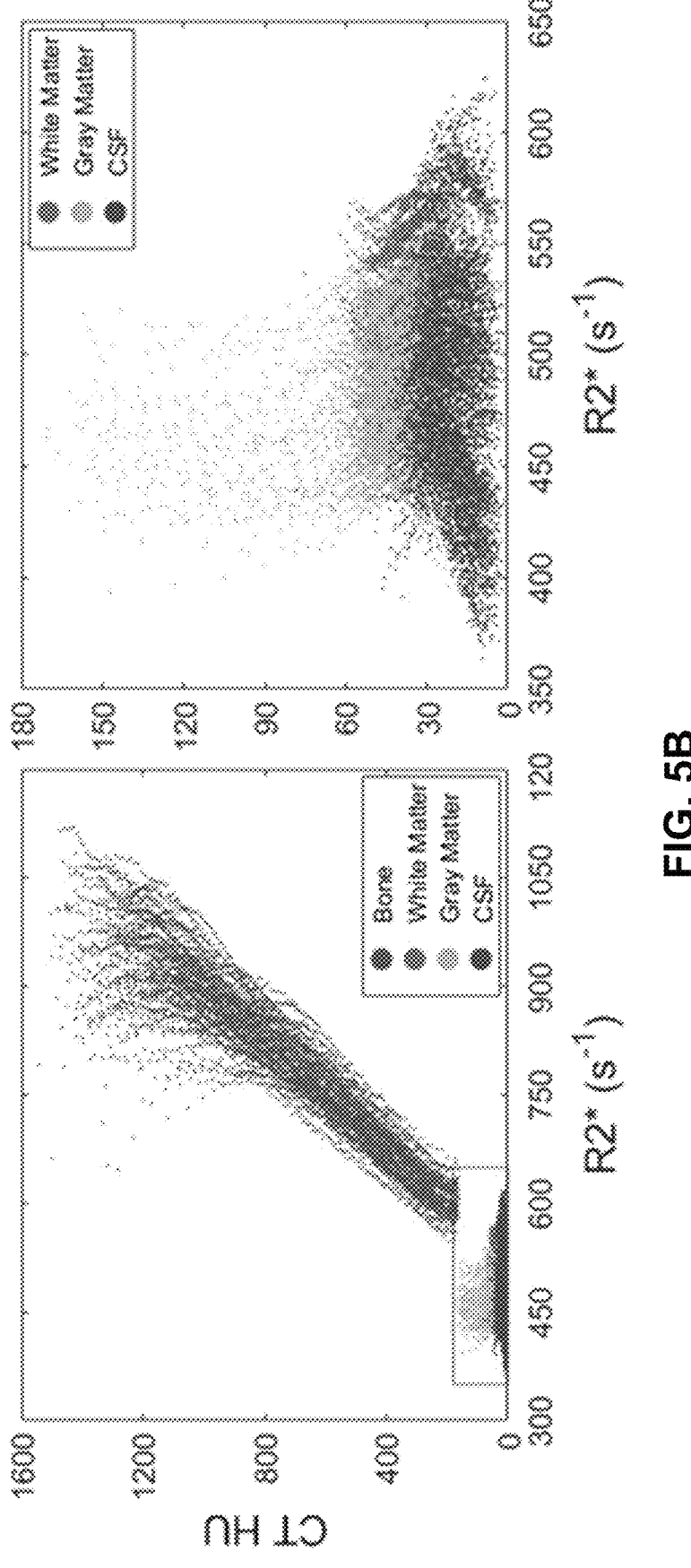
FIG. 5B contains graphs comparing UTE R2* and CT HU in bone and soft tissues (right panels: magnified insets from soft tissues).
Figure 5C:
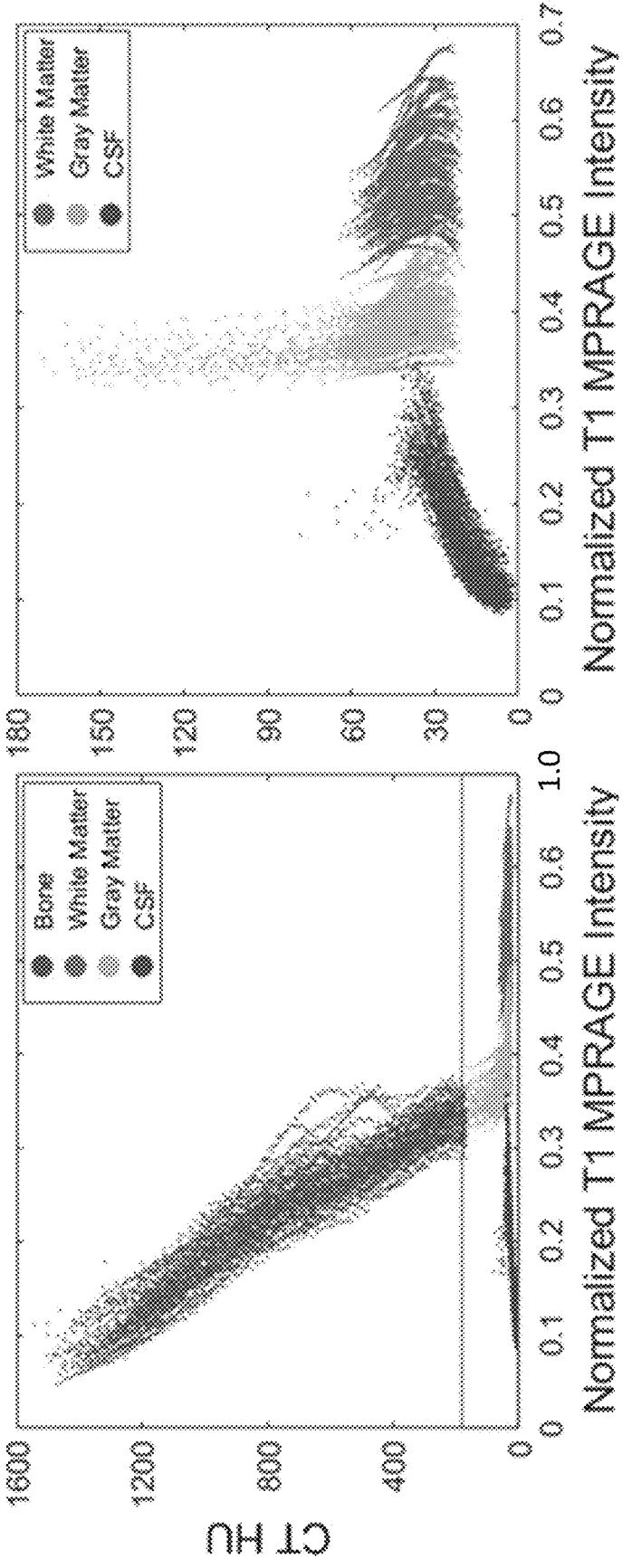
FIG. 5C contains graphs comparing normalized T1 MPRAGE signal and CT HU in bone and soft tissues (right panels: magnified insets from soft tissues).

For each participant's CT images, voxels within each tissue type (bone, gray matter, white matter, and CSF) were sorted into 100 bins based on their CT HU percentile. The mean HU of each bin was then plotted against the mean R1, R2* values or normalized T1-MPRAGE signal from the same voxels to evaluate the associations between R1, R2* and T1-MPRAGE images with CT HU (FIGS. 5A, 5B, and 5C, respectively). In FIG. 5C, the T1-MPRAGE signal was normalized to a range of 0-1 using the 0.5th and 99.5th percentiles signal as the minimum and maximum, respectively.

FIGS. 5A, 5B, and 5C show the R1, R2*, and normalized T1-MPRAGE signals, respectively and their corresponding CT HU in bone and soft tissues from all participants. R1 values were much higher in bone than in soft tissues, and they were also distinct between gray matter, white matter, and CSF. Furthermore, R1 values were associated with CT HU in the bone and soft tissues (FIG. 5A). R2* values were also higher in bone than in soft tissues. However, the separation between bone and soft tissue in R2* was not as distinct as in R1. R2* demonstrated substantial overlap among soft tissues (FIG. 5B). R2* was associated with CT HU only in bone, but not in soft tissues. Finally, the T1-MPRAGE signal exhibited complete overlapping between bone and CSF as well as bone and gray matter (FIG. 5C), although it could separate soft tissues.

Figure 6:
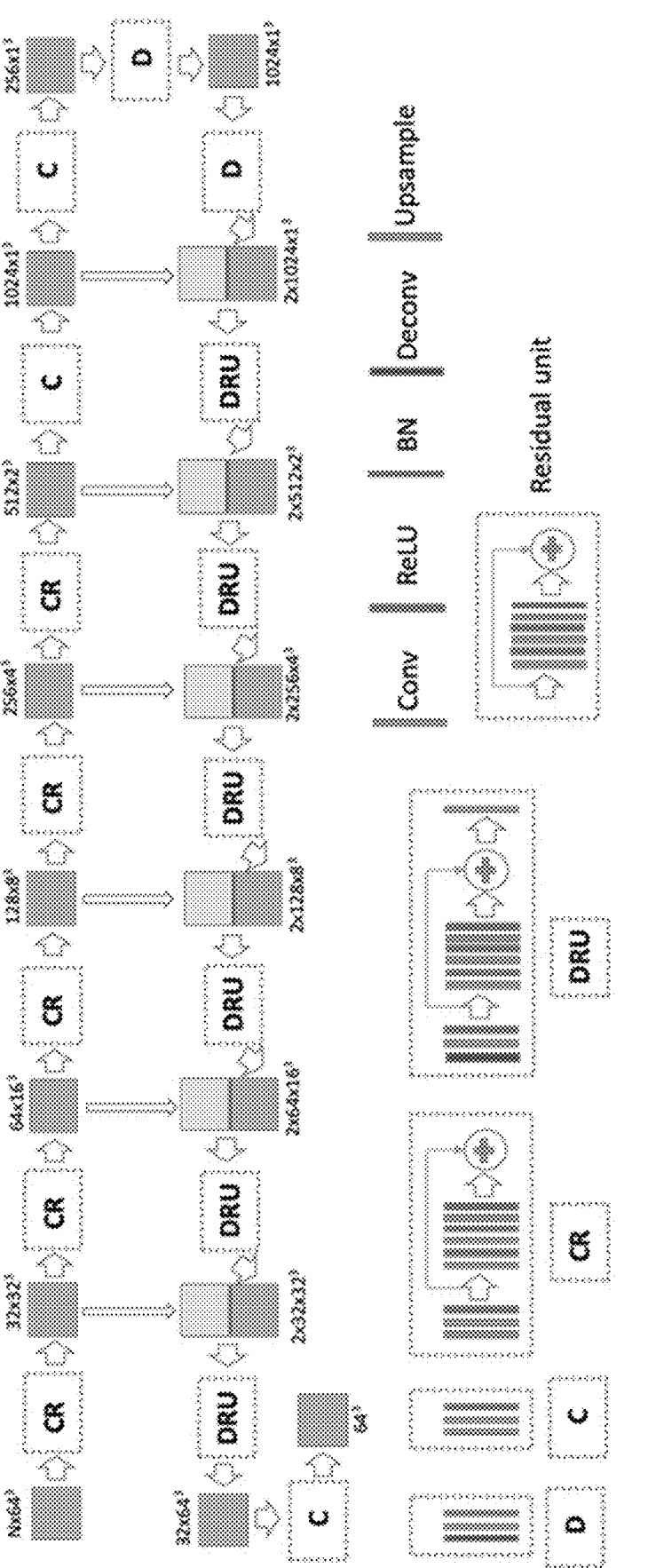
FIG. 6 is a schematic illustration of a 3D ResUNet AI model. The 3D ResUNet AI model includes consists of four main units: the convolutional (C) and the convolutional residual (CR) units in the contraction path, as well as the deconvolutional (D) and the deconvolutional/residual/up-sampling (DRU) units in the expansion path. The C unit includes convolution, batch normalization (BN), and the rectified linear unit (ReLU), while the CR unit includes convolution, BN, ReLU, and the residual units. The D unit includes deconvolution, BN, and ReLU, while DRU consists of deconvolution, BN, ReLU, the residual unit, and upsampling.

A 3D ResUNet was developed for pCT estimation (FIG. 6). The 174 participants in group A were randomly divided into a training set (n=72), validation set (n=18), and testing set (n=84). Before network training, intensity normalizations were performed as normalized parameter=(parameter−mean)/(2×SD). The normalized parameter is half of the standard score. The means and SDs of CT HU or R1 and R2* were computed from all participants. They were computed for each participant to normalize the T1-MPRAGE signal. They were obtained from each pair of images to preserve the signal relationship in UTE FA1E1 and FA2E1, FA2E1 and FA2E2, and Dixon in- and opp-phase image pairs for each participant.

3D image patches of a size 64×64×64 were used for training the ResUNet. The placement of a patch is determined by its center voxel. Patches were extracted without enforcing nonoverlapping in training. The 3D ResUNet consisting of 7 layers in both the contraction and expansion paths was trained using the Adam optimizer with a batch size of 10 (FIG. 6). The objective function is the absolute difference (L1 difference) between the pCTs and ground-truth CTs. The learning rate was initialized at $10^3$ and empirically decreased by half after every 50,000 batches. The convolution kernel sizes were 7, 5, 5, 5, 5, 3 (stride=2 for down-sampling) and 1 in the contraction path from top to bottom, whereas the convolutional kernels used in the expansion path were 1, 3, 3, 7, 7, 9, 9 from the bottom to top. The activation function used in the contraction path was leaky rectified linear unit (ReLU) (0.2), and the expansion path used regular ReLU. The total training parameters were 123,984,256 in DL-TESLA and DL-UTER*, 123,973,280, and 123,962,304 in DL-Dixon and DL-T1MPR, respectively. The parameters for all the convolutional elements were initialized as random values generated from a Gaussian distribution N(0, sqrt(2/n)) (n, number of parameters in the kernel), and the bias element was initialized as 0. The batch normalization element was initialized as the random value with Gaussian distribution N(1.0, 0.02) with bias initialized as 0.

The training and validation processes took ~12 days on a GeForce GTX 1080 Ti GPU card. The validation set (n=18) was used to choose the model. The final network was then deployed to generate pCT in the remaining participants in group A (n=84) for independent testing. Four networks with almost identical network structures but different inputs were tested; (1) DL-TESLA model with 3 channels of input: FA1E1, FA2E1 UTE images, and R1 maps, (2) DL-UTER$_{2*}$ model with 3 channels of input: FA2E1, FA2E2 UTE images, and R* maps, 22 (3) DL-Dixon model with 2 channels of input: in- and opp-phase Dixon images, and (4) DL-T1MPR model with 1 channel of input: T1-MPRAGE images. In group B participants with longitudinal data (n=23), DL-TESLA was applied to estimate pCTs in both visits. The trained networks were applied to 64×64×64 patches in moving windows with a step size of 16 pixels in each direction. Only the center 32×32×32 voxels of these patches were used to generate pCT. The pCT value at a given voxel was computed as the average value of the overlapped patches at this particular voxel. It takes ~40 s to apply and combine all the individual patches.

Figure 12:
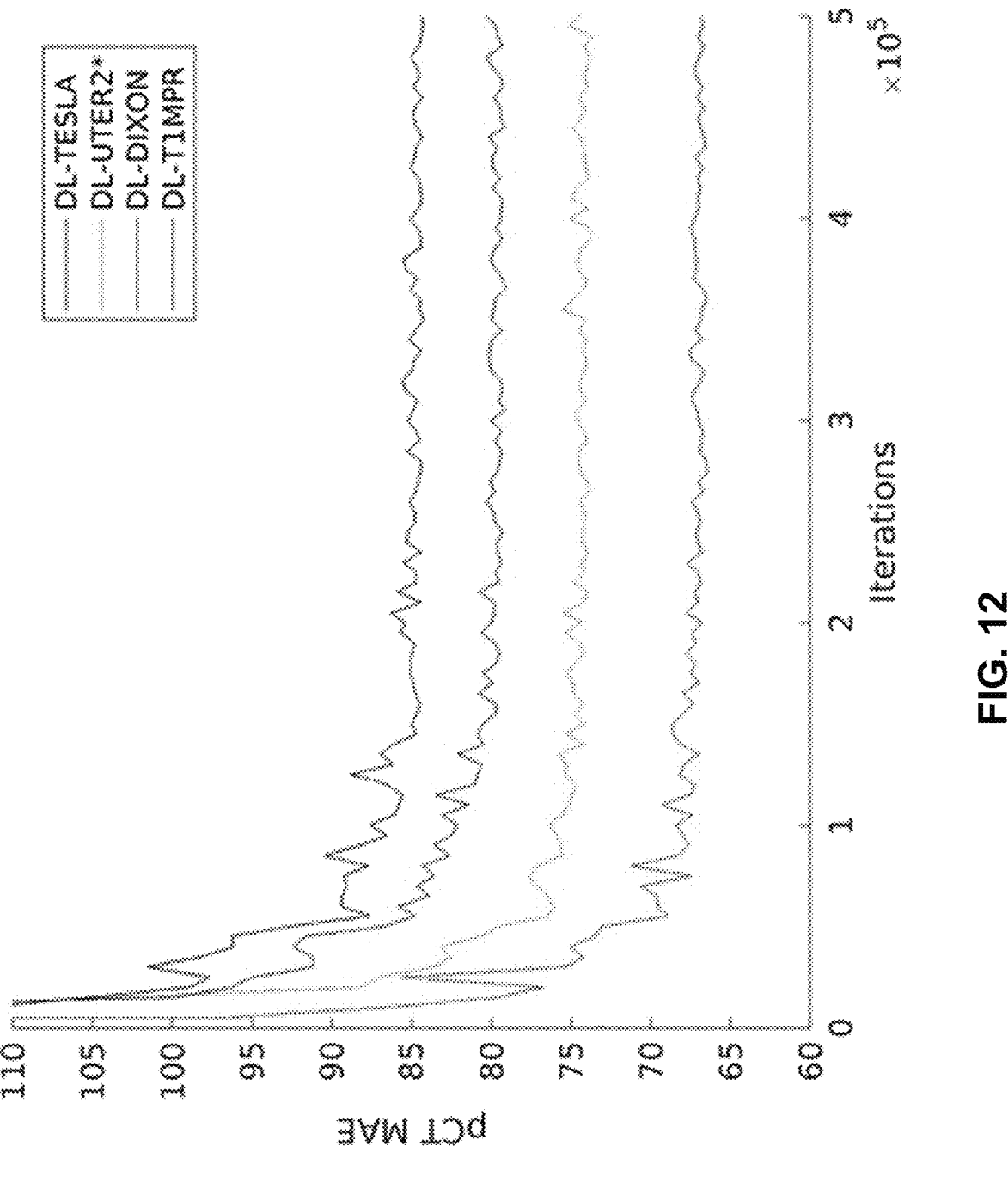
FIG. 12 is a graph summarizing the mean absolute error (MAE) of pCT as a function of iterations using a validation data set.

All 4 networks were trained using 500,000 iterations with 10 randomly extracted patches as 1 batch in each iteration. pCT MAEs for the validation participants were plotted as a function of iterations in FIG. 12. All networks reached a steady state after ~150,000-200,000 iterations with 1.5-2 million patches. DL-TESLA pCT had the smallest MAE, followed by DL-UTER*, DL-Dixon, and DL-T1MPR in the validation data sets.

CTs and pCTs were converted to PET LAC values by piecewise linear scaling. The vendor-provided e7tools program (Siemens Medical Solutions, Knoxville, Tenn.) was used to reconstruct PET list mode data acquired from 50-70 min post-tracer injection. An ordinary Poisson ordered subset expectations maximization (OP-OSEM) algorithm with 3 iterations, 21 subsets, and a 5 mm Gaussian filter was used. In the test-retest repeatability analysis, AC maps computed using acquired CTs and DL-TESLA pCTs from visit 1 and visit 2 were used for visit 1 PET data. A comparison between PET data from visit 1 and visit 2 was avoided because of potential PET signal changes resulting from pathophysiological progression over 3 years.

Example 2: Accuracy of DL-TESLA Model for pCT

To evaluate the accuracy of the machine learning models described in Example, the following experiments were conducted.

The accuracy of the proposed models was evaluated using the acquired CT images as the gold-standard reference. The whole brain mean absolute error (MAE) of pCT was computed as expressed in Equation (4):

$$MAE = \frac{\sum_{i=1}^{N} |pCT_i - CT_i|}{N} \qquad (4)$$

The accuracies of the pCT in identifying bone and air were evaluated using the Dice coefficient as expressed in Equation (5):

$$\text{Dice coefficient} = \frac{2(pCT \cap CT)}{pCT + CT} \qquad (5)$$

PET images reconstructed using either the CT or the pCT-based $\mu$-map were registered to the International Consortium for Brain Mapping (ICBM) atlas using FLIRT and Advanced Normalization Tools (ANTs).

Voxel-based PET relative error was computed as expressed in Equation (6):

$$\text{Relative error}(\%) = \frac{PET_{pCT} - PET_{CT}}{PET_{CT}} \times 100\% \qquad (6)$$

The percentages of the voxels in the brain with a relative PET error between ±3% and ±5% were calculated for each participant.

Voxel-based PET relative absolute error was computed as expressed in Equation (7):

$$\text{Relative absolute error}(\%) = \frac{|PET_{pCT} - PET_{CT}|}{PET_{CT}} \times 100\% \qquad (7)$$

PET AC accuracies were evaluated using mean relative error (MRE) and mean relative absolute error (MRAE) in whole brain and 10 FreeSurfer defined ROIs with high relevance to AD pathology.

Figure 7A:
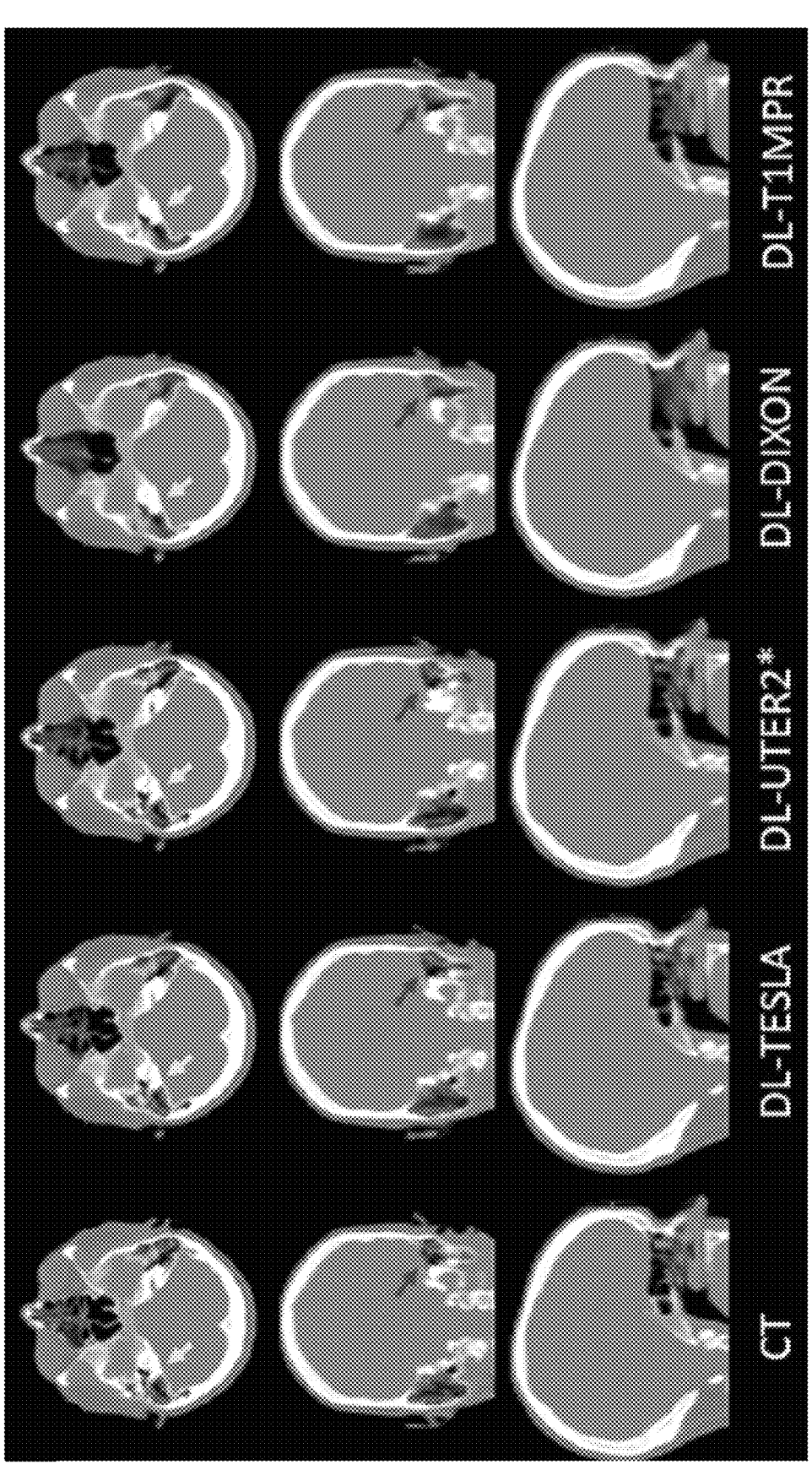
FIG. 7A contains a series of representative CT and pCT maps.
Figure 7B:
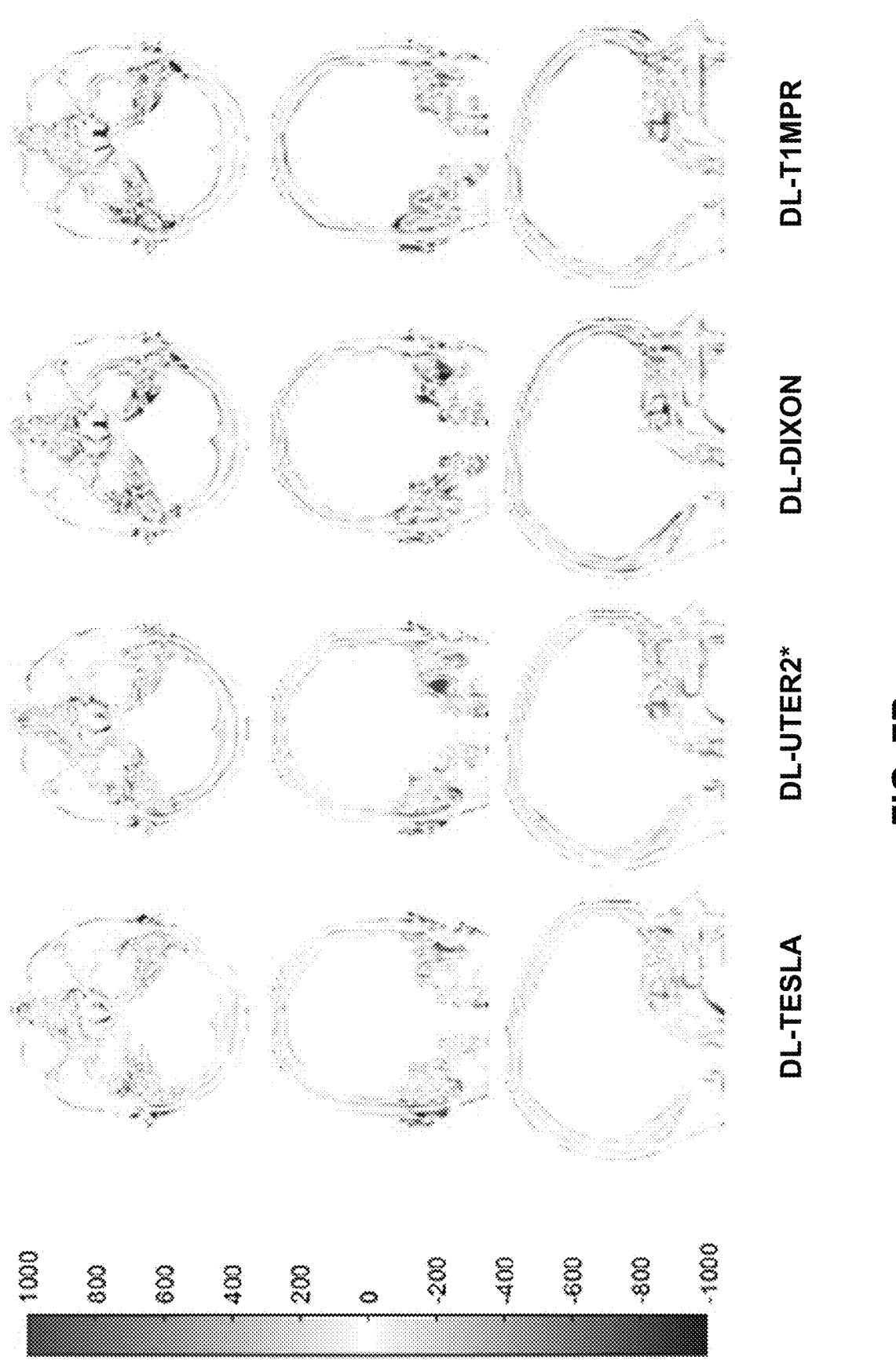
FIG. 7B contains a series of CT HU differences maps between pCT and CT based on the maps of FIG. 7A.

All networks (DL-TESLA, DL-UTER2*, DL-DIXON, and DL-T1MPR) provided pCT maps closely resembling the gold standard reference CT (FIG. 7A). On close examination, we found that DL-TESLA exhibited the best performance in identifying the fine details of bone and separating air and bone, followed by DL-UTER2*, DL-Dixon, and DL-T1MPR. Furthermore, DL-TESLA displayed the smallest difference in CT HU between pCT and CT, followed by DL-UTER2*, DL-Dixon, and DL-T1MPR.

Figure 10A:
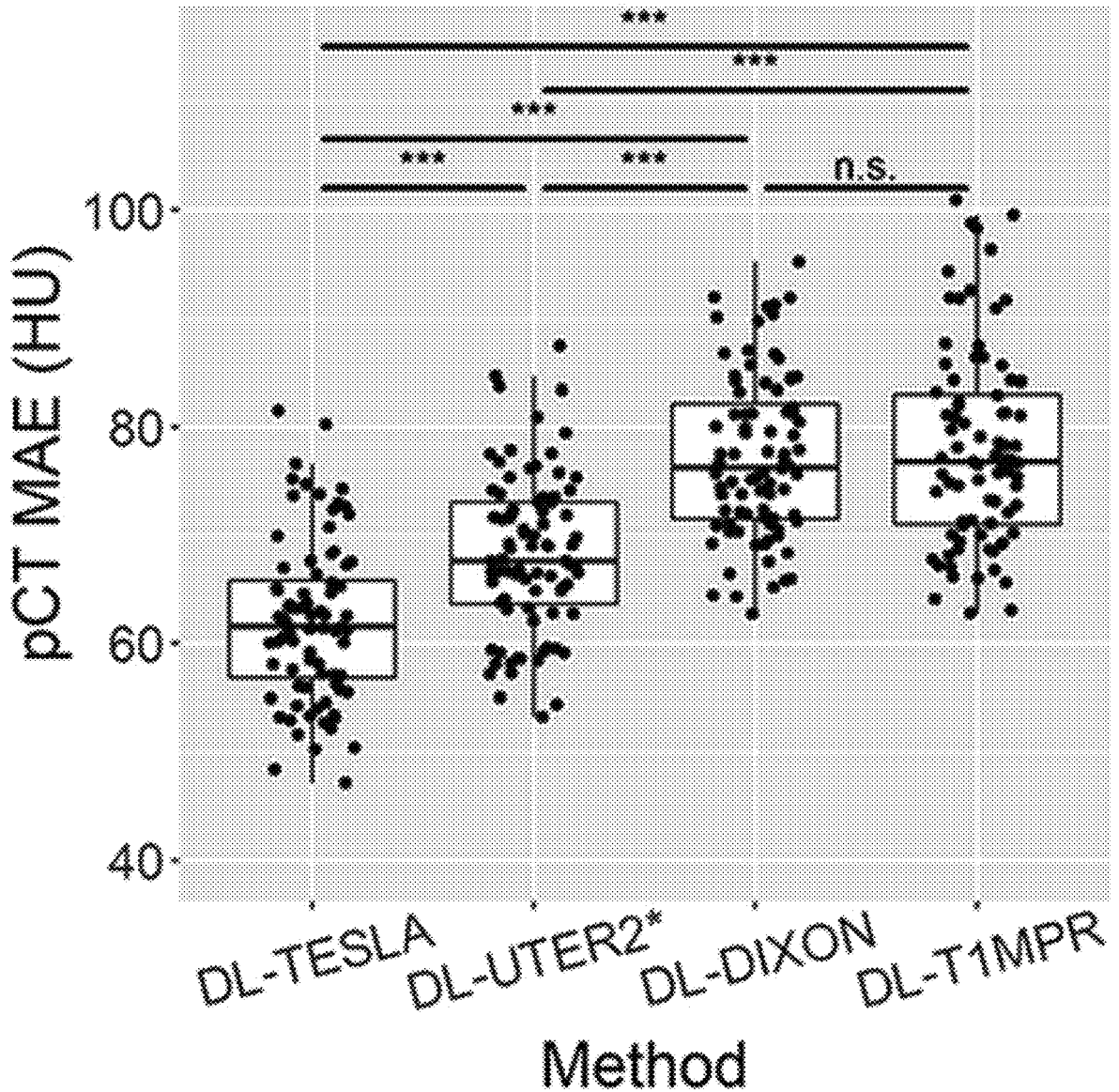
FIG. 10A is a graph with boxplots showing the $25^{th}$, $50^{th}$ (median), and $75^{th}$ percentiles of the mean absolute error (MAE) between pCT and CT; (*P<0.05, P<0.01, *P<0.001, n.s.=not significant).
Figure 10B:
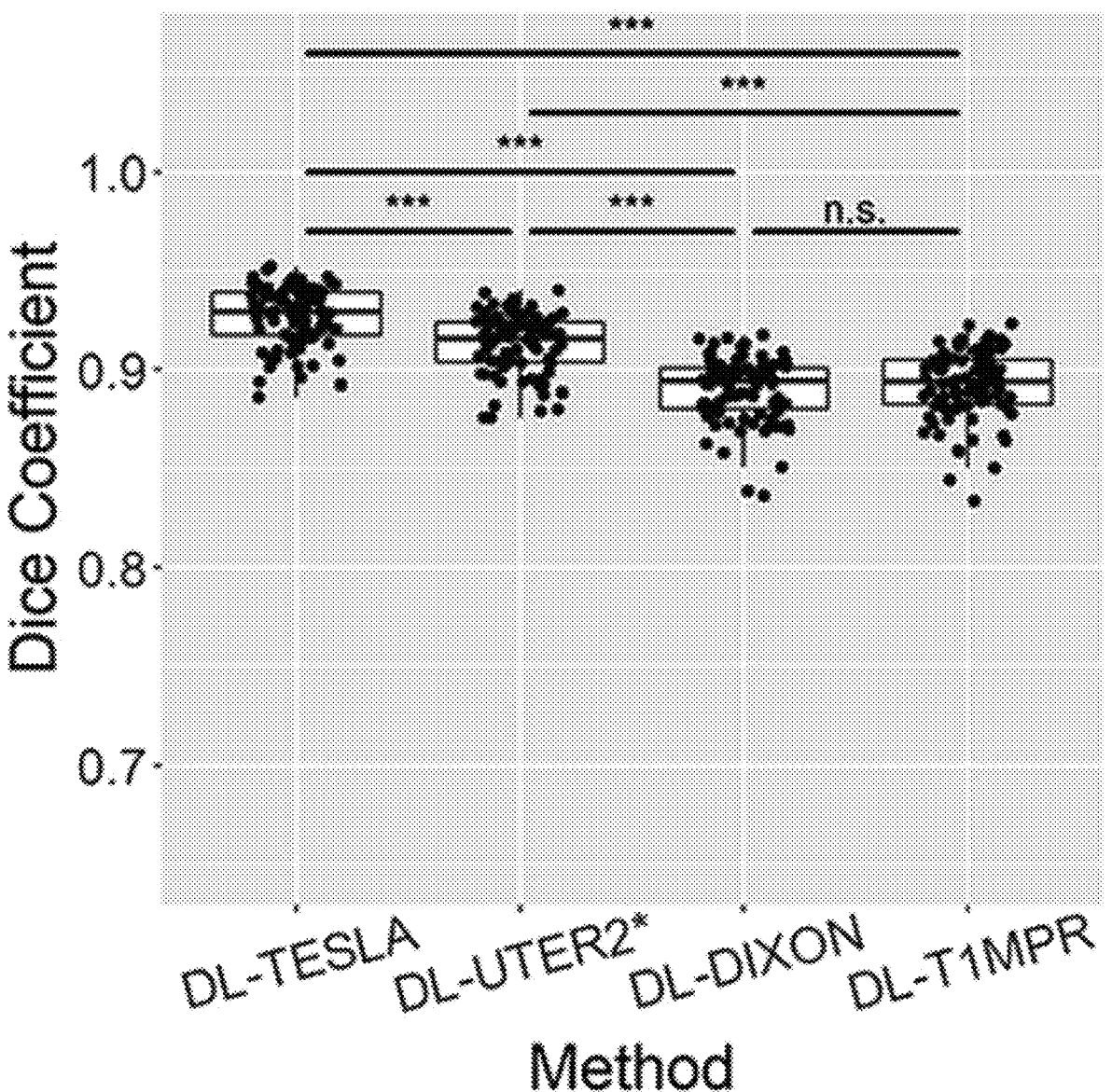
FIG. 10B is a graph with boxplots showing the $25^{th}$, $50^{th}$ (median), and $75^{th}$ percentiles of the Dice coefficients between pCT and CT in bone; (*P<0.05, P<0.01, *P<0.001, n.s.=not significant).
Figure 10C:
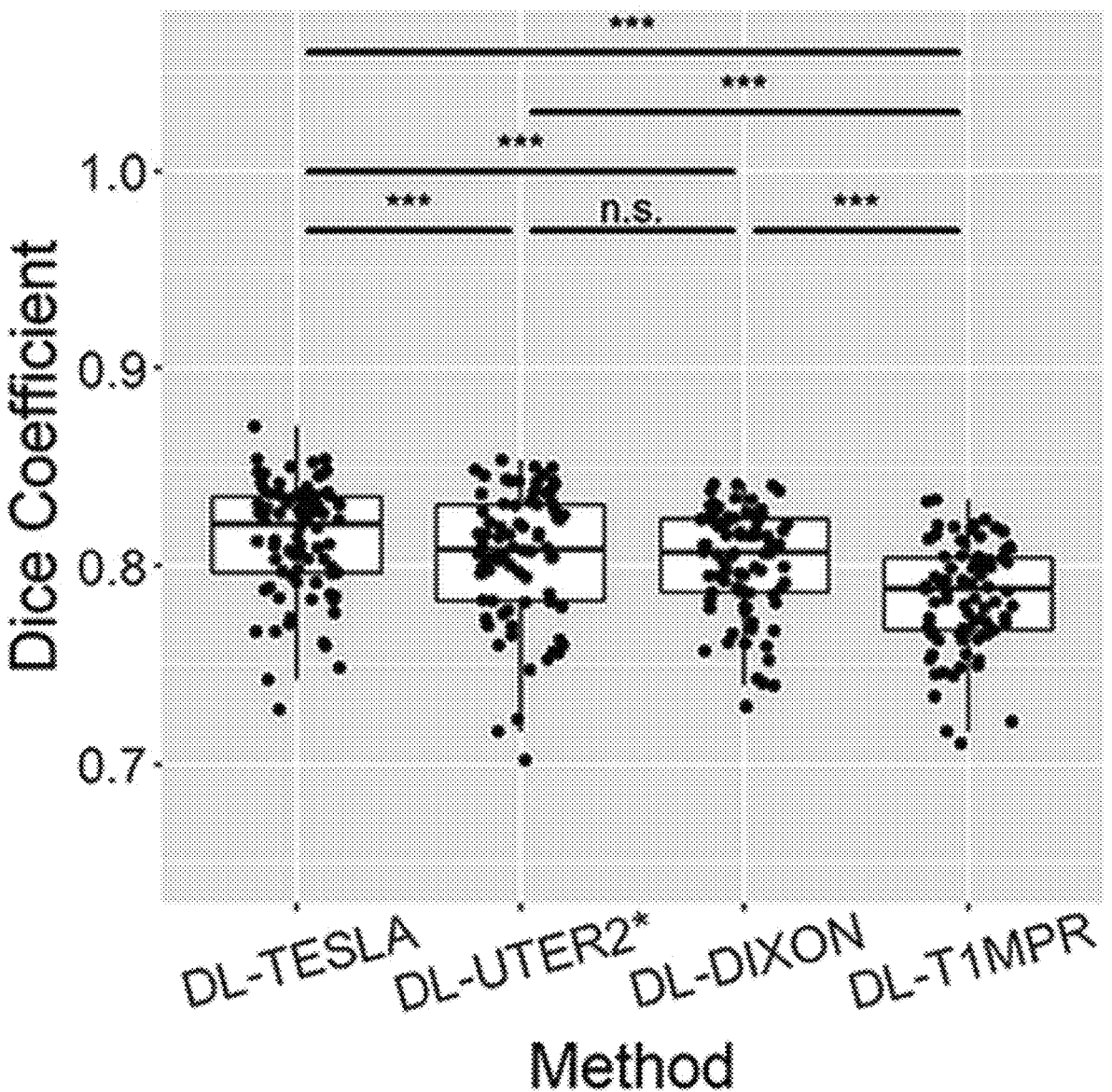
FIG. 10C is a graph with boxplots showing the $25^{th}$, $50^{th}$ (median), and $75^{th}$ percentiles of the Dice coefficients between pCT and CT in bone; (*P<0.05, P<0.01, *P<0.001, n.s.=not significant).
Figure 11A:
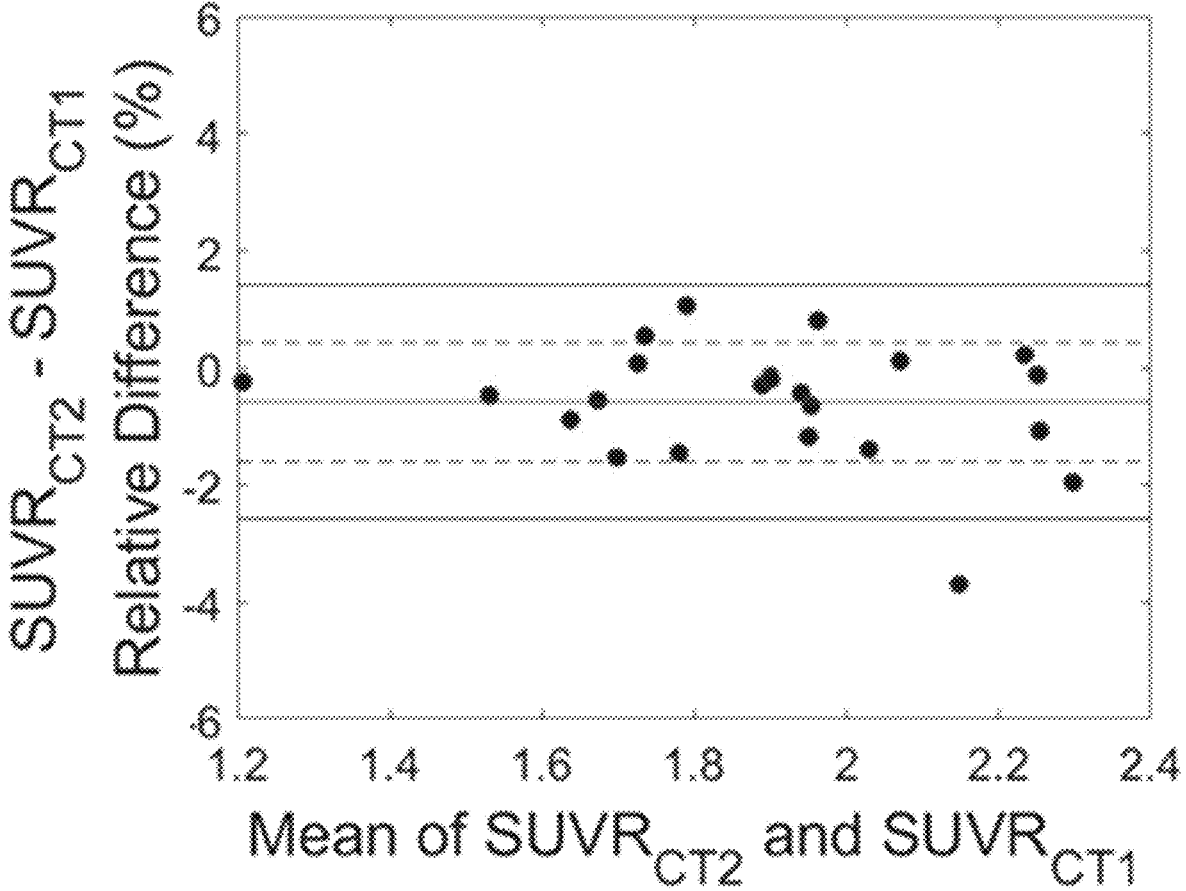
FIG. 11A is a Bland-Altman plot summarizing the PET SUVR differences between two CT ACs in the whole cerebrum. The red horizontal line, dotted black horizontal lines, and solid black horizontal lines represent the mean, ±SD, and ±1.96 □SD, respectively, of the test-retest SUVR differences.
Figure 11B:
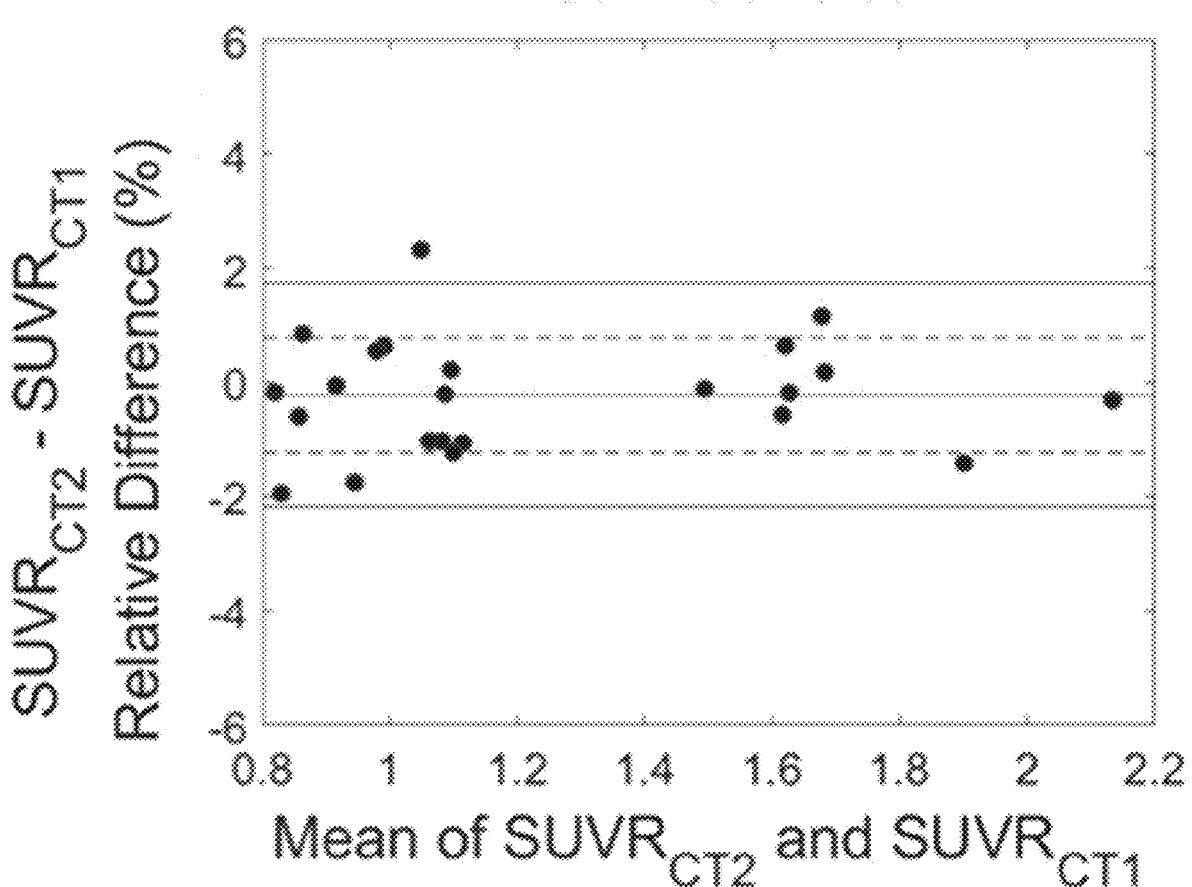
FIG. 11B is a Bland-Altman plot summarizing the PET SUVR difference between two CT ACs in the mean cortical (MC). The red horizontal line, dotted black horizontal lines, and solid black horizontal lines represent the mean, ±SD, and ±1.96 □SD, respectively, of the test-retest SUVR differences.
Figure 11C:
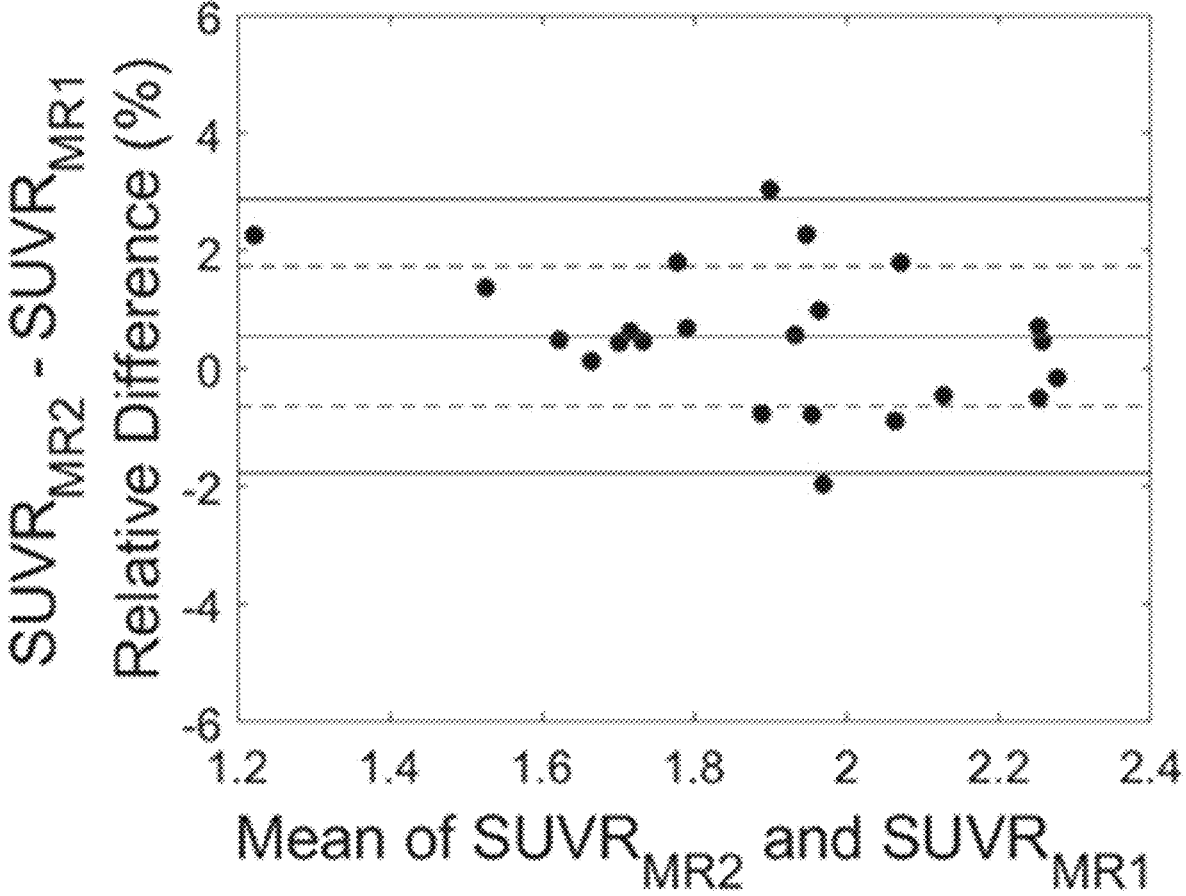
FIG. 11C is a Bland-Altman plot summarizing the PET SUVR difference between two DL-TESLA ACs in the whole cerebrum. The red horizontal line, dotted black horizontal lines, and solid black horizontal lines represent the mean, ±SD, and ±1.96 □SD, respectively, of the test-retest SUVR differences.
Figure 11D:
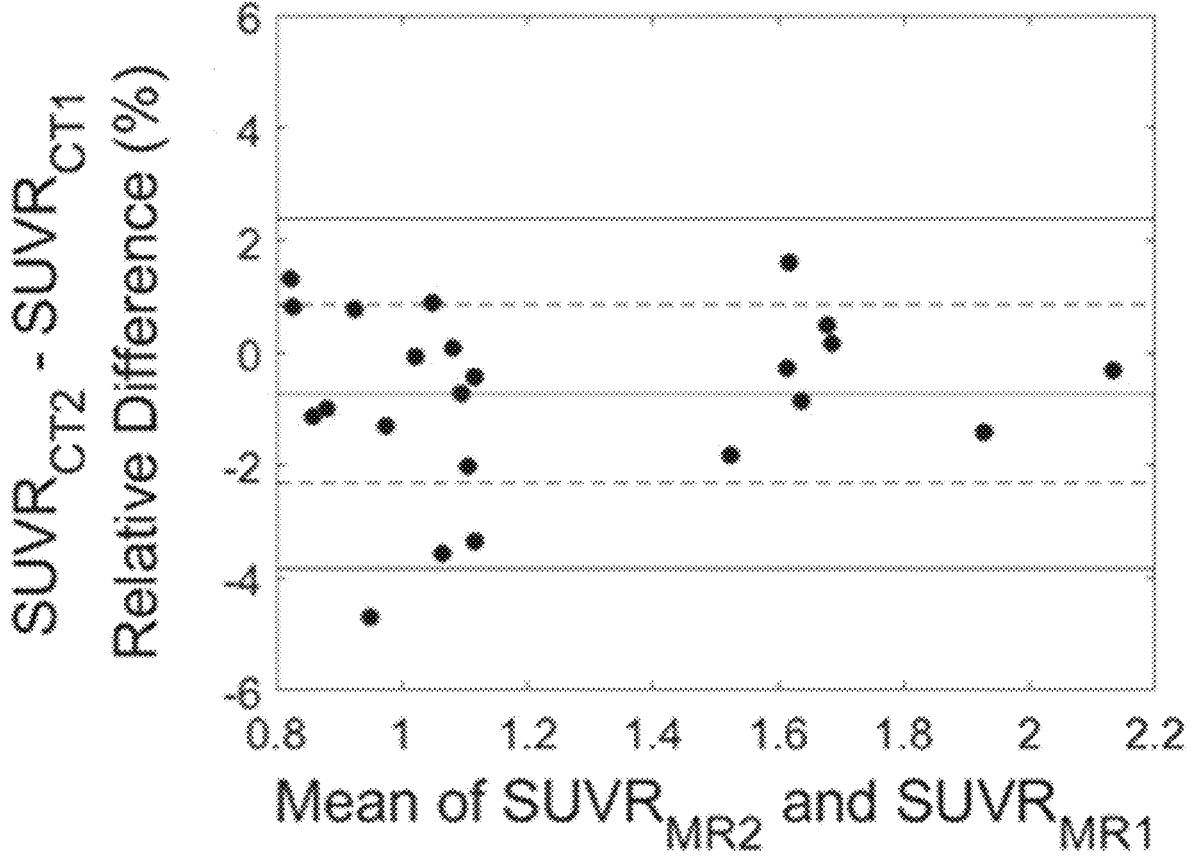
FIG. 11D is a Bland-Altman plot summarizing the PET SUVR difference between two DL-TESLA ACs in the mean cortical (MC). The red horizontal line, dotted black horizontal lines, and solid black horizontal lines represent the mean, ±SD, and 1.96□SD, respectively, of the test-retest SUVR differences.

The means and SDs of the pCT MAE for DL-TESLA, DL-UTER*, DL-Dixon, and DL-T1MPR were 62.07±7.36 HU, 68.26±7.30 HU, 77.18±7.52 HU, and 78.00±9.05 HU, respectively (FIG. 10A) on the testing data in group A. DL-TESLA had a significantly lower MAE than all other networks (P<0.001), whereas DL-UTER* had a significantly lower MAE than both DL-Dixon and DL-T1MPR (P<0.001). The Dice co-efficients between pCT and CT were 0.927±0.015, 0.913±0.015, 0.890±0.016, and 0.892±0.018 in bone and 0.814±0.029, 0.805±0.033, 0.802±0.027, and 0.785±0.026 in air (within head only) for DL-TESLA, DL-UTER*, DL-Dixon, and DL-T1MPR, respectively (FIG. 5B,C). DL-TESLA had significantly higher Dice coefficients than all other networks in both bone and air.

Figure 8A:
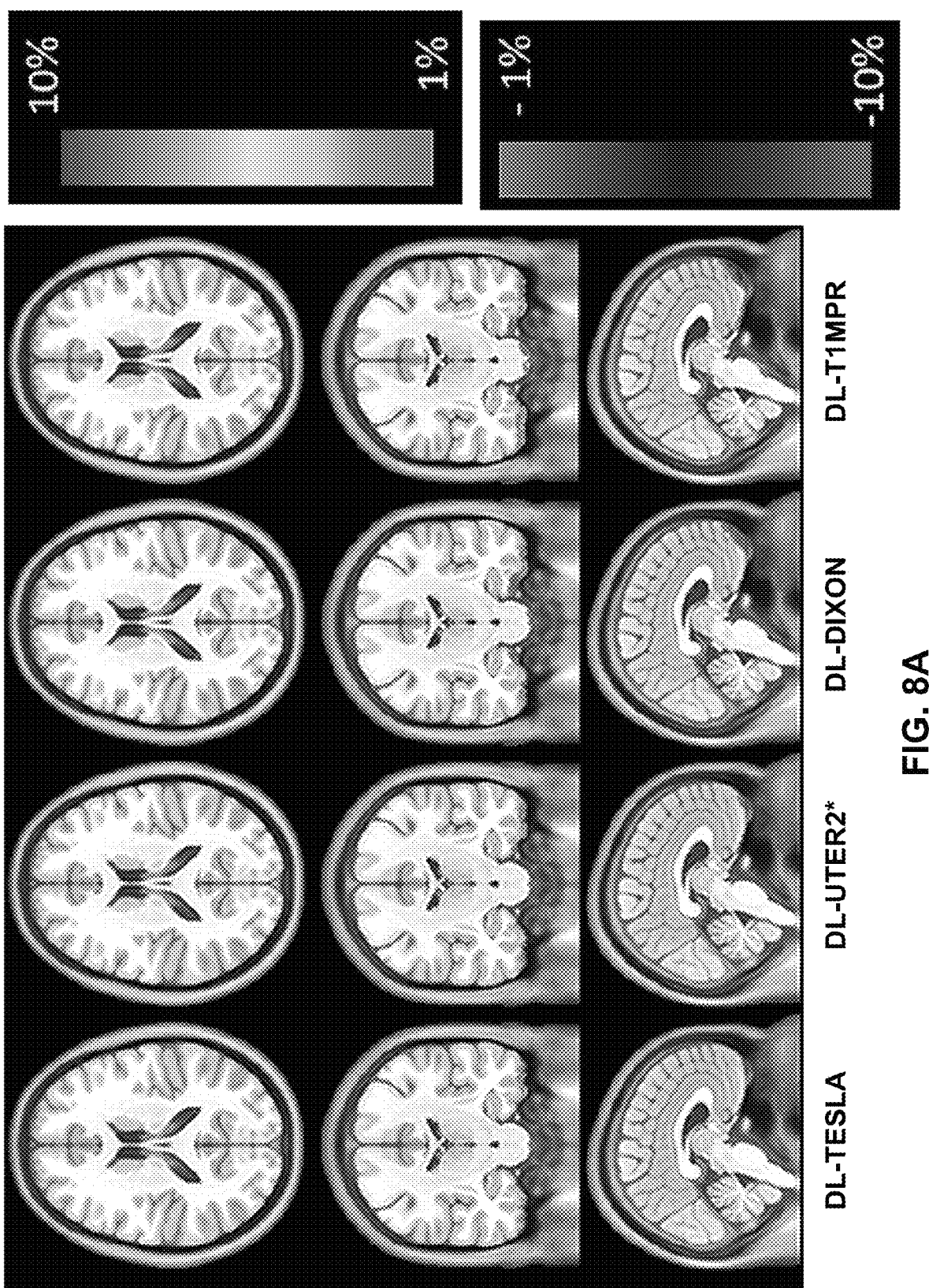
FIG. 8A contains spatial maps of the mean of PET relative error on the voxel basis across testing subjects in Group A (n=84). The continuous CT AC method was used as the gold standard reference.
Figure 8B:
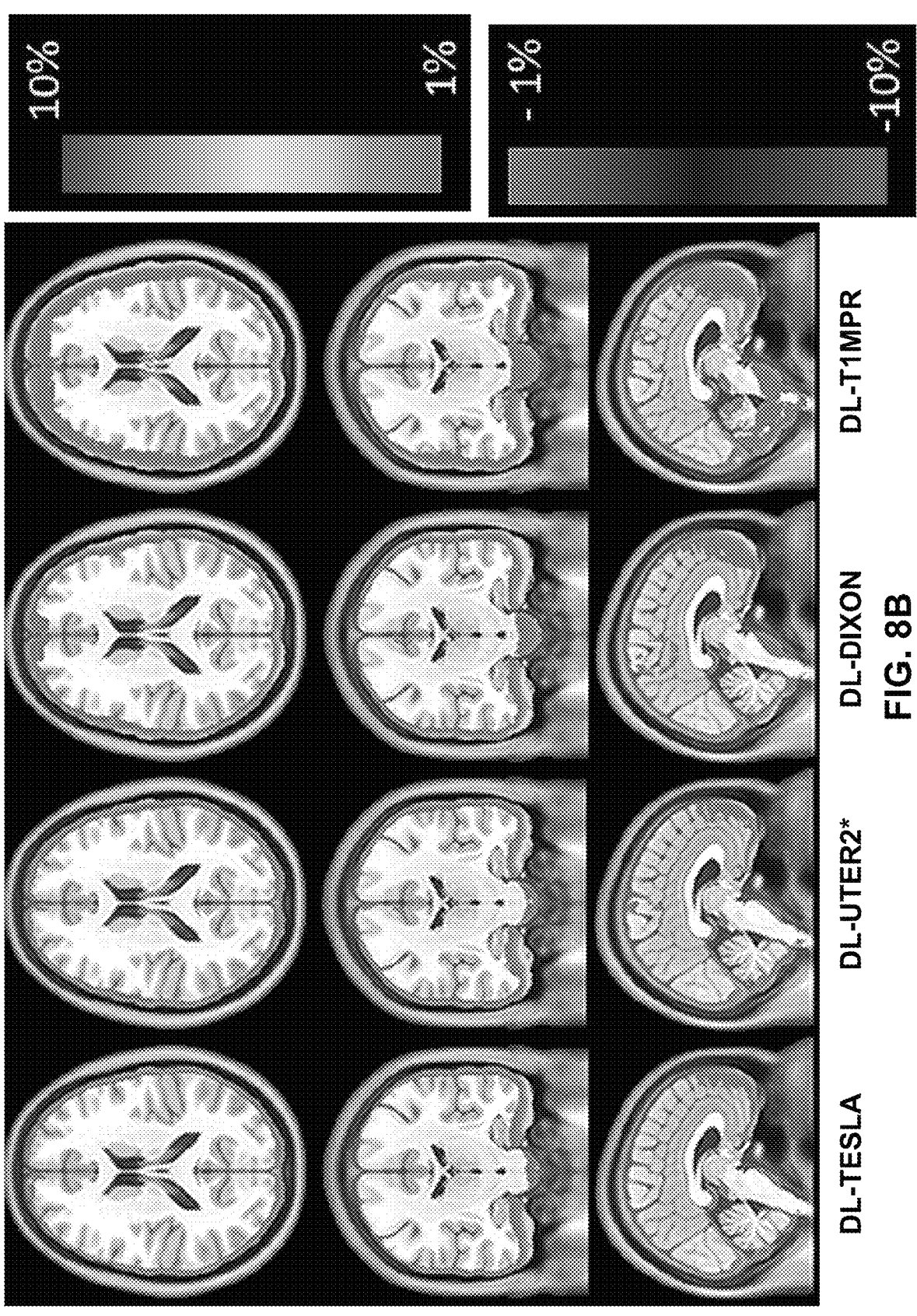
FIG. 8B contains spatial maps of the standard deviation (SD) of PET relative error on the voxel basis across testing subjects in Group A (n=84). The continuous CT AC method was used as the gold standard reference.
Figure 9A:
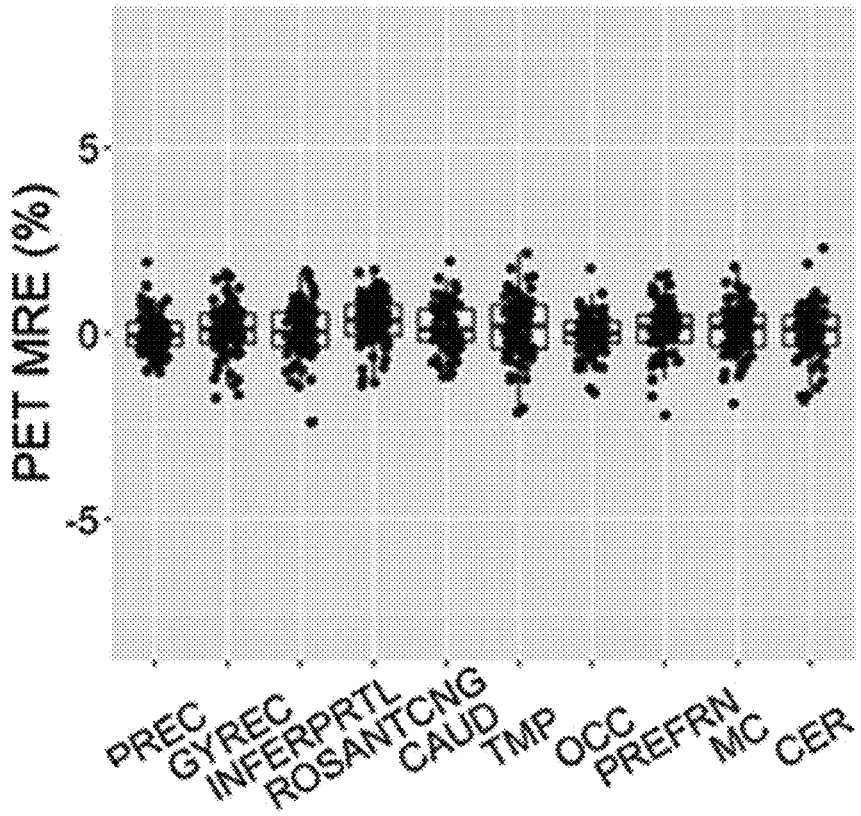
FIG. 9A contains PET MRE boxplots showing the $25^{th}$, $50^{th}$ (median), and $75^{th}$ percentiles in 10 ROIs based on linear attenuation corrections from DL-TESLA; ROIs included Precuneus (PREC), Gyrusrectus (GYREC), Parietal cortex (INFERPRTL), Rostral anterior cingulate (ROSANTCNG), Caudate (CAUD), Temporal cortex (TMP), Occipital cortex (OCC), Prefrontal cortex (PREFRN), Cerebellum cortex (CER), and "Mean cortical" region (MC).
Figure 9B:
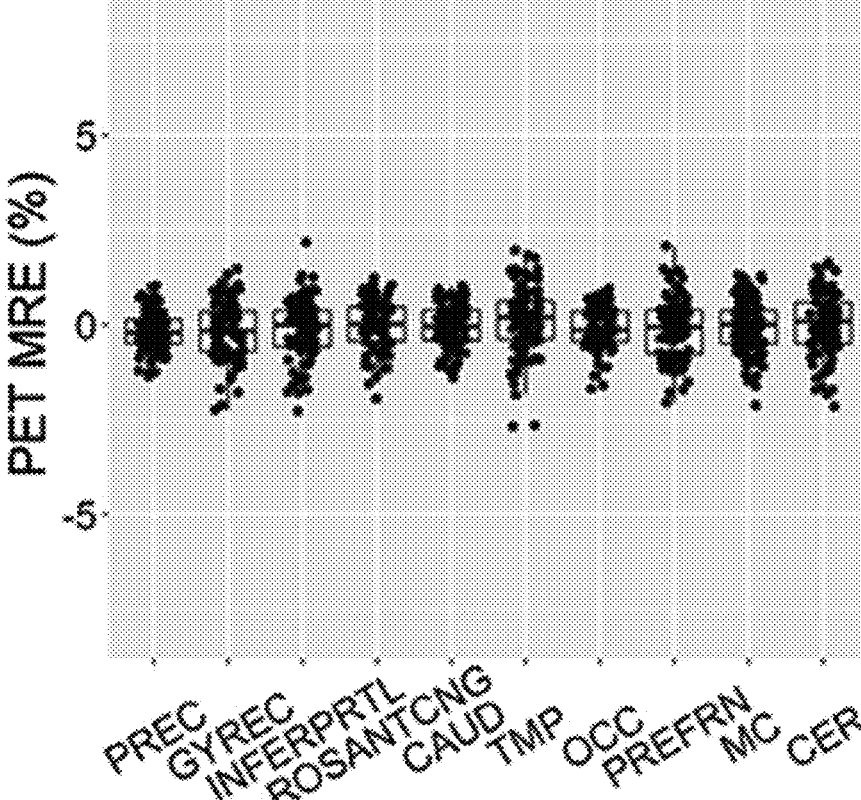
FIG. 9B contains PET MRE boxplots showing the $25^{th}$, $50^{th}$ (median), and $75^{th}$ percentiles in 10 ROIs based on linear attenuation corrections from DL-UTER2*; ROIs included Precuneus (PREC), Gyrusrectus (GYREC), Parietal cortex (INFERPRTL), Rostral anterior cingulate (ROSANTCNG), Caudate (CAUD), Temporal cortex (TMP), Occipital cortex (OCC), Prefrontal cortex (PREFRN), Cerebellum cortex (CER), and "Mean cortical" region (MC).
Figure 9C:
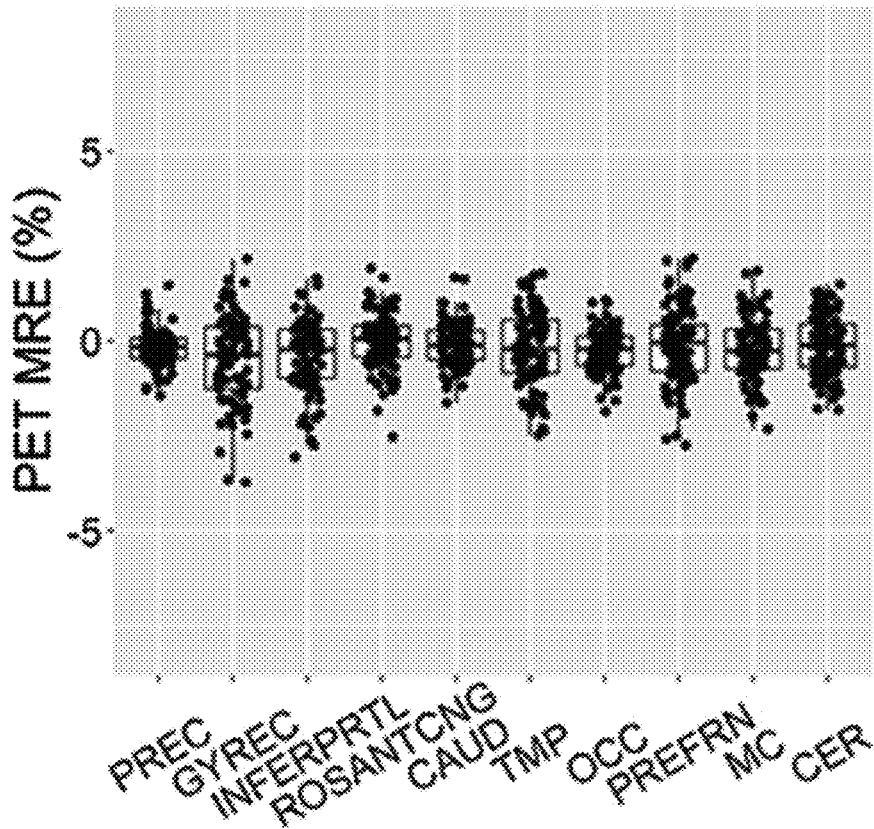
FIG. 9C contains PET MRE boxplots showing the $25^{th}$, $50^{th}$ (median), and $75^{th}$ percentiles in 10 ROIs based on linear attenuation corrections from DL-DIXON; ROIs included Precuneus (PREC), Gyrusrectus (GYREC), Parietal cortex (INFERPRTL), Rostral anterior cingulate (ROSANTCNG), Caudate (CAUD), Temporal cortex (TMP), Occipital cortex (OCC), Prefrontal cortex (PREFRN), Cerebellum cortex (CER), and "Mean cortical" region (MC).
Figure 9D:
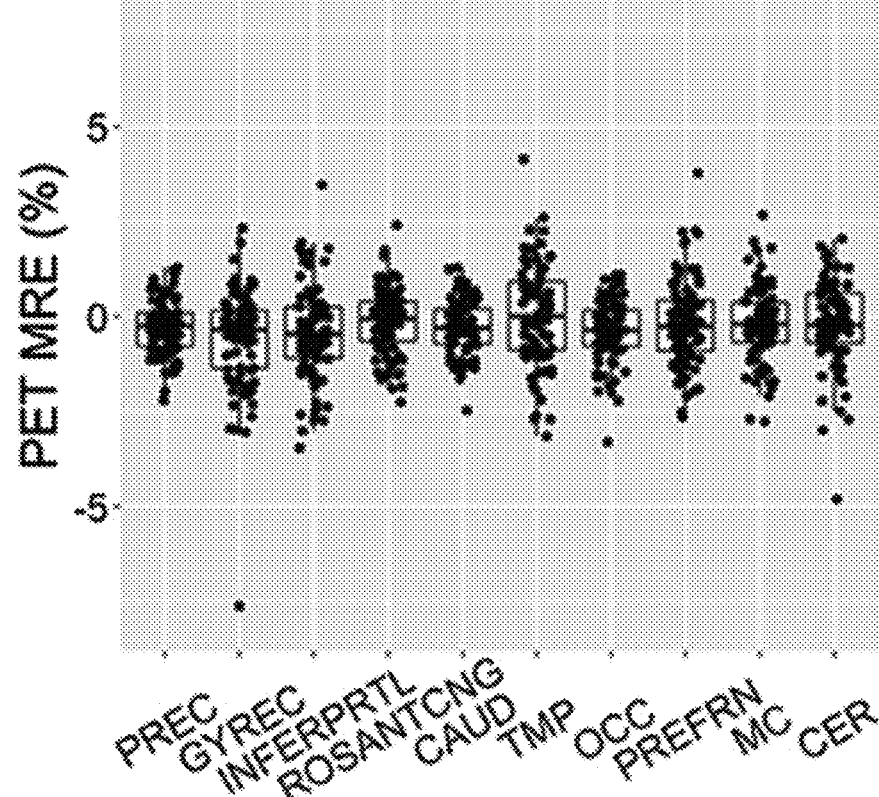
FIG. 9D contains PET MRE boxplots showing the $25^{th}$, $50^{th}$ (median), and $75^{th}$ percentiles in 10 ROIs based on linear attenuation corrections from DL-T1MPR; ROIs included Precuneus (PREC), Gyrusrectus (GYREC), Parietal cortex (INFERPRTL), Rostral anterior cingulate (ROSANTCNG), Caudate (CAUD), Temporal cortex (TMP), Occipital cortex (OCC), Prefrontal cortex (PREFRN), Cerebellum cortex (CER), and "Mean cortical" region (MC).
Figure 9E:
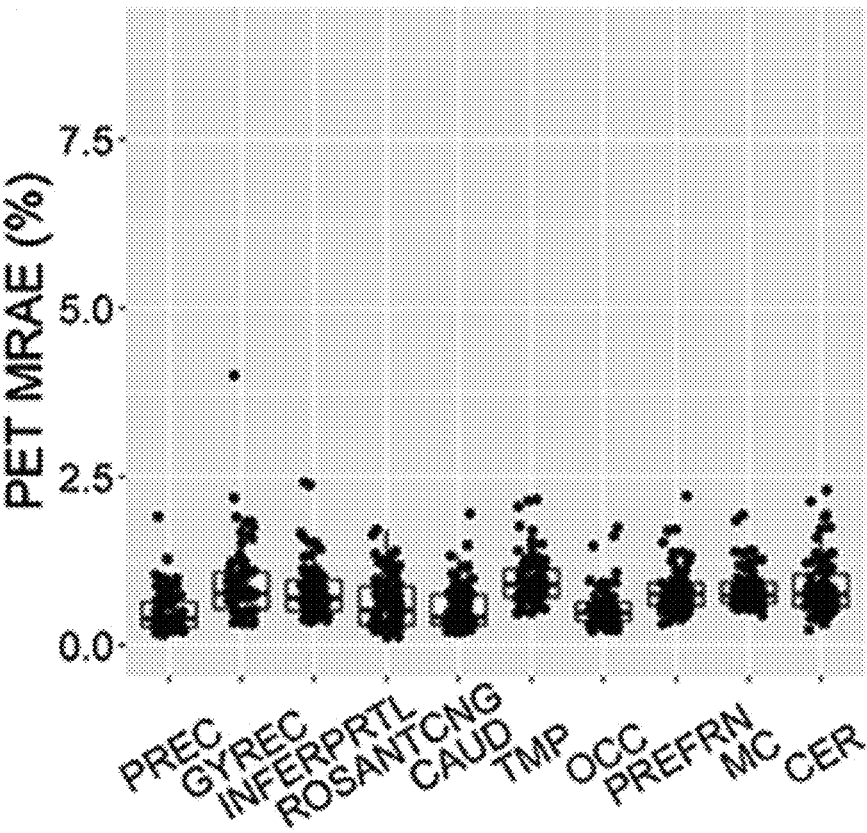
FIG. 9E contains PET MRAE boxplots showing the $25^{th}$, $50^{th}$ (median), and $75^{th}$ percentiles in 10 ROIs based on linear attenuation corrections from DL-TESLA; ROIs included Precuneus (PREC), Gyrusrectus (GYREC), Parietal cortex (INFERPRTL), Rostral anterior cingulate (ROSANTCNG), Caudate (CAUD), Temporal cortex (TMP), Occipital cortex (OCC), Prefrontal cortex (PREFRN), Cerebellum cortex (CER), and "Mean cortical" region (MC).
Figure 9F:
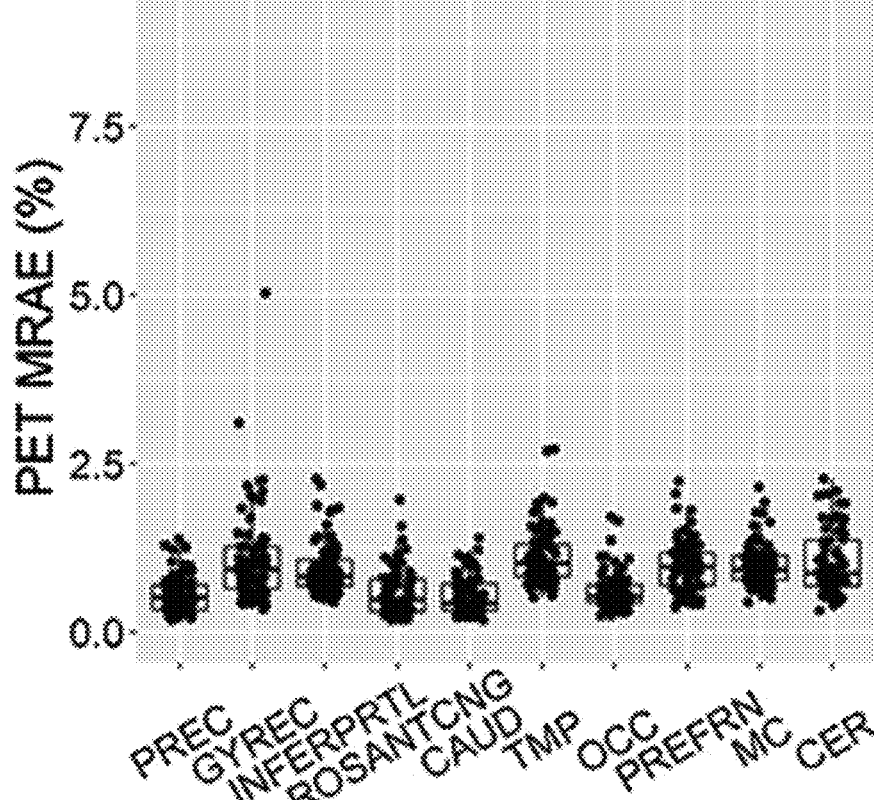
FIG. 9F contains PET MRAE boxplots showing the $25^{th}$, $50^{th}$ (median), and $75^{th}$ percentiles in 10 ROIs based on linear attenuation corrections from DL-UTER2*; ROIs included Precuneus (PREC), Gyrusrectus (GYREC), Parietal cortex (INFERPRTL), Rostral anterior cingulate (ROSANTCNG), Caudate (CAUD), Temporal cortex (TMP), Occipital cortex (OCC), Prefrontal cortex (PREFRN), Cerebellum cortex (CER), and "Mean cortical" region (MC).
Figure 9G:
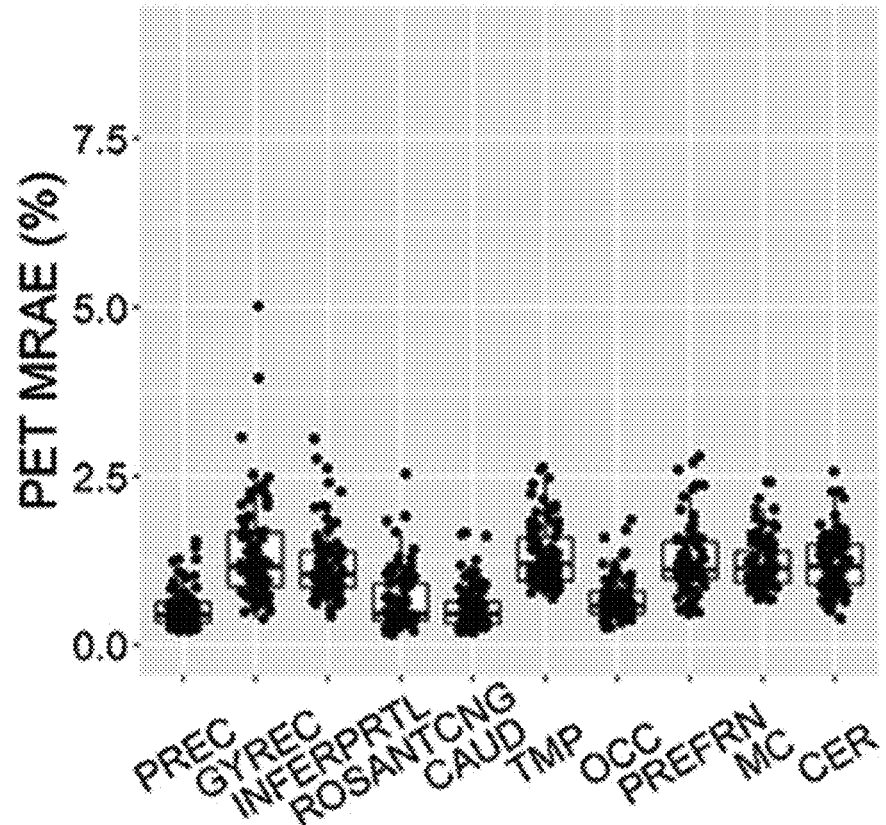
FIG. 9G contains PET MRAE boxplots showing the $25^{th}$, $50^{th}$ (median), and $75^{th}$ percentiles in 10 ROIs based on linear attenuation corrections from DL-DIXON; ROIs included Precuneus (PREC), Gyrusrectus (GYREC), Parietal cortex (INFERPRTL), Rostral anterior cingulate (ROSANTCNG), Caudate (CAUD), Temporal cortex (TMP), Occipital cortex (OCC), Prefrontal cortex (PREFRN), Cerebellum cortex (CER), and "Mean cortical" region (MC).
Figure 9H:
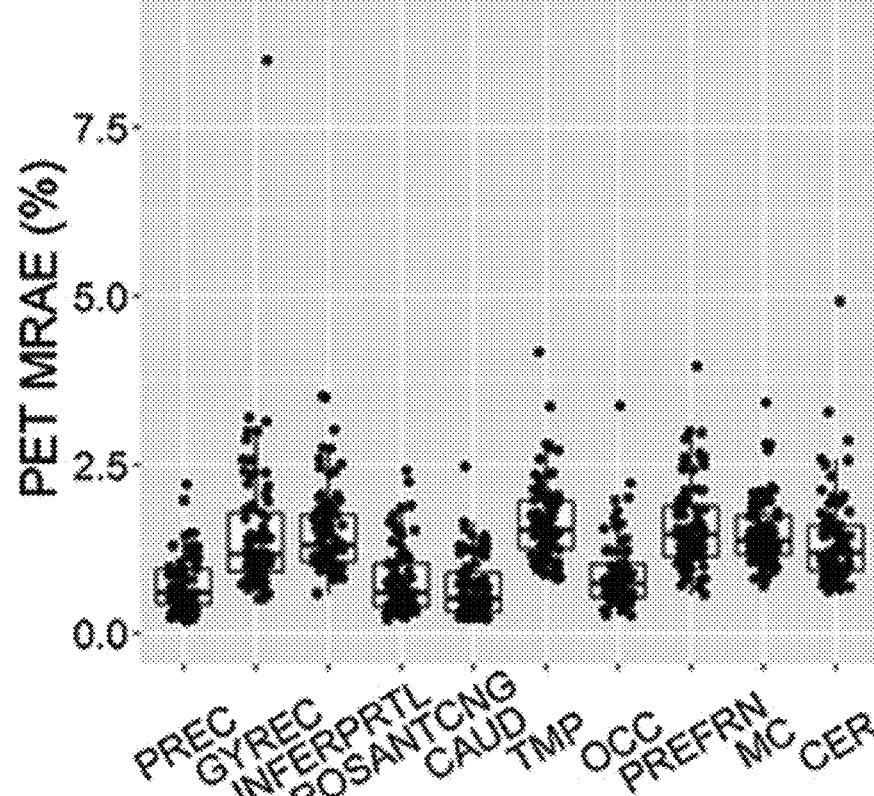
FIG. 9H contains PET MRAE boxplots showing the $25^{th}$, $50^{th}$ (median), and $75^{th}$ percentiles in 10 ROIs based on linear attenuation corrections from DL-T1MPR; ROIs included Precuneus (PREC), Gyrusrectus (GYREC), Parietal cortex (INFERPRTL), Rostral anterior cingulate (ROSANTCNG), Caudate (CAUD), Temporal cortex (TMP), Occipital cortex (OCC), Prefrontal cortex (PREFRN), Cerebellum cortex (CER), and "Mean cortical" region (MC).

The accuracy of PET AC was evaluated using the testing participants in group A. The mean and standard deviation of the PET MRE across participants was between −1% and 1% in most brain regions for all 4 models (FIGS. 8A and 8B). The DL-TESLA model exhibited both the lowest PET relative error and SD, followed by DL-UTER*, DL-Dixon, and then, DL-T1MPR.

The whole-brain PET MREs were 0.10±0.56%, −0.06±0.61%, −0.15 0.63%, and −0.20±0.82%, and the whole-brain PET MRAEs were 0.67±0.27%, 0.78 0.26%, 0.89±0.29%, and 1.09±0.41% with DL-TESLA, DL-UTER*, DL-UTER2* (P<0.001), DL-Dixon (P<0.001), and DL-T1MPR.

In the regional analysis (FIGS. (9A, 9B, 9C, 9D, 9E, 9F, 9G, and 9H), except in the rostral anterior cingulate (ROSANTCNG) and caudate (CAUD) ROIs, DL-TESLA displayed a significantly smaller PET MRAE than DL-UTER2* (P<0.05). Except in the precuneus (PREC), ROSANTCNG, and CAUD ROIs, DL-TESLA exhibited a significantly smaller PET MRAE than DL-Dixon (P<0.001). DL-TESLA showed a significantly smaller PET MRAE than DL-T1MPR in all regions (P<0.001). Except in the PREC, ROSANTCNG, and CAUD ROIs, DL-UTER* had significantly smaller PET MRAE than DL-Dixon (P<0.05). DL-UTER2* had significantly smaller PET MRAE than DL-T1MPR (P<0.01) in all ROIs. Except in the ROSANTCNG ROI, DL-Dixon had a significantly smaller PET MRAE than DL-T1MPR (P<0.05).

Figure 13A:
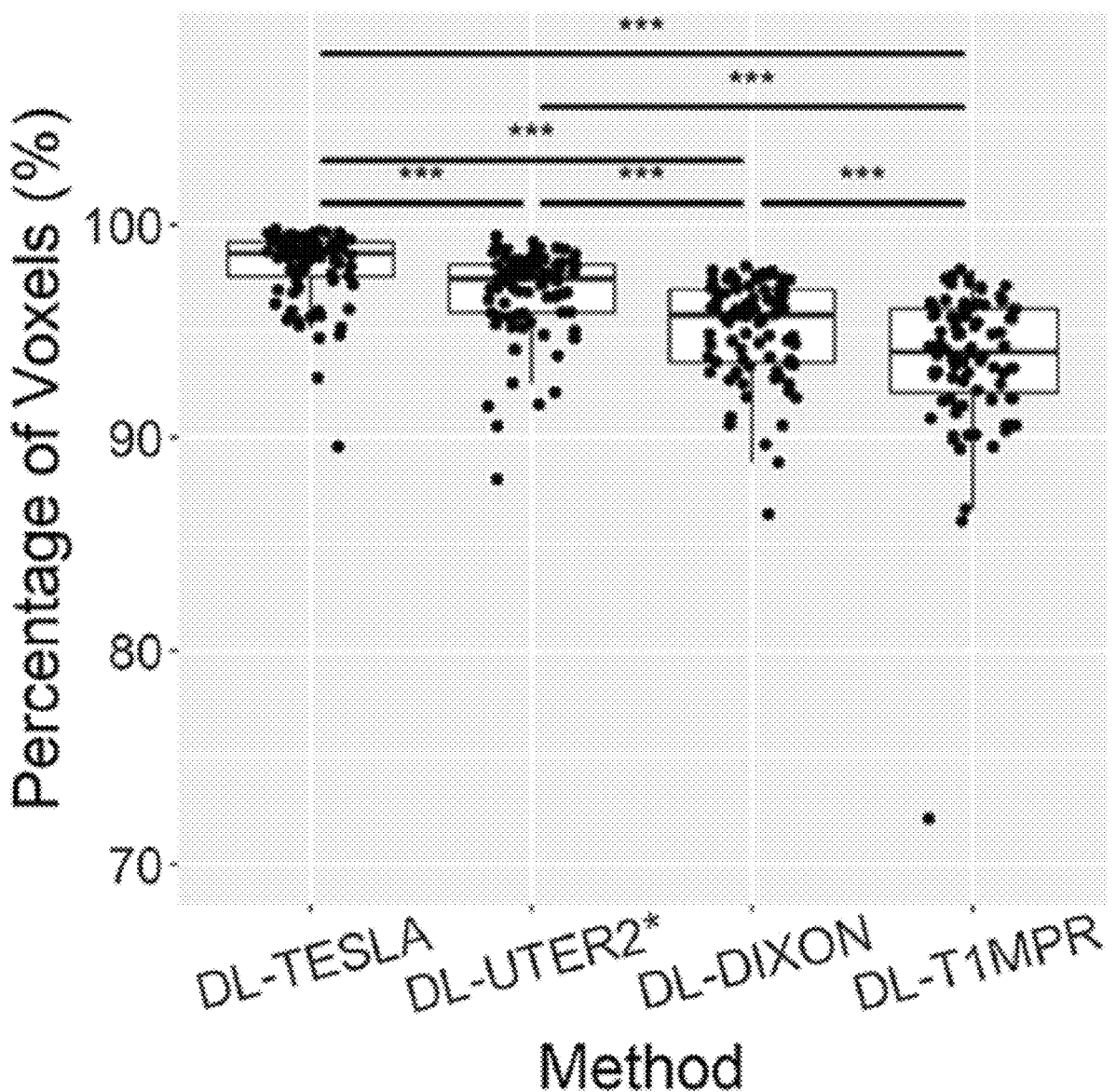
FIG. 13A is a graph with boxplots showing the $25^{th}$, $50^{th}$ (median), and $75^{th}$ percentiles of voxels with a PET relative error within ±3% MRE; ***P<0.001.
Figure 13B:
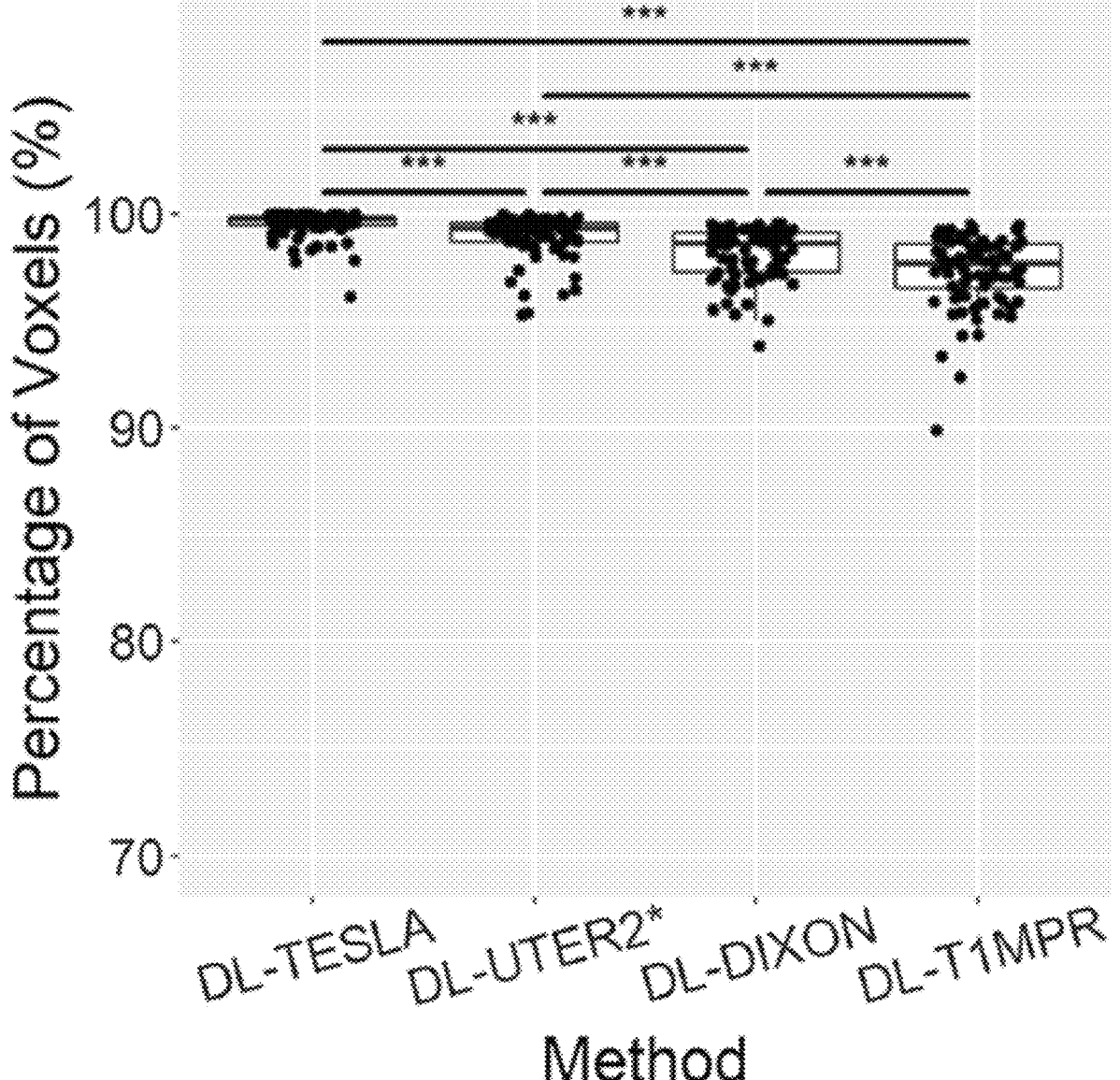
FIG. 13B is a graph summarizing the boxplots showing the $25^{th}$, $50^{th}$ (median), and $75^{th}$ percentiles of voxels with a PET relative error within ±5% MRE; ***P<0.001.
Figure 13C:
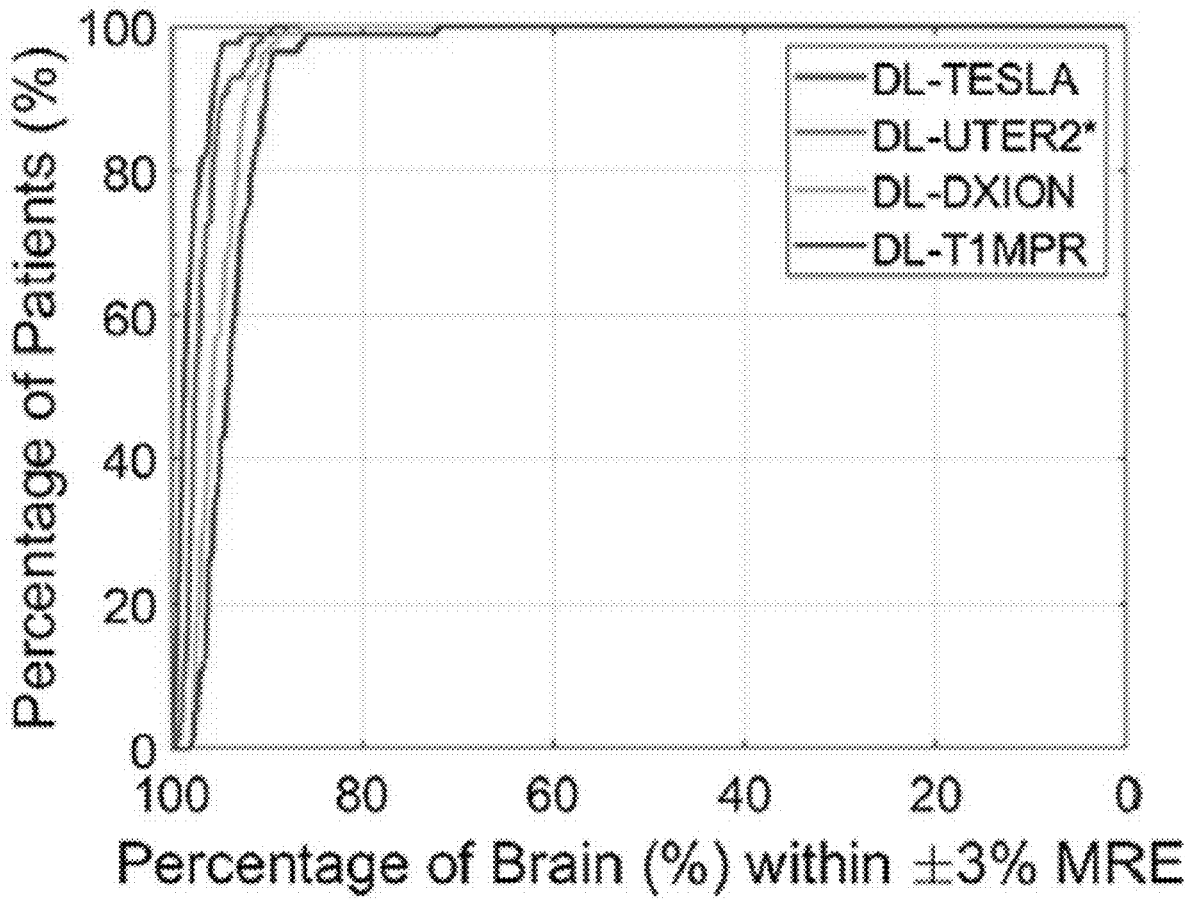
FIG. 13C is a graph summarizing the percentage of patients as a function of various percentages of brain voxels within ±3% MRE.
Figure 13D:
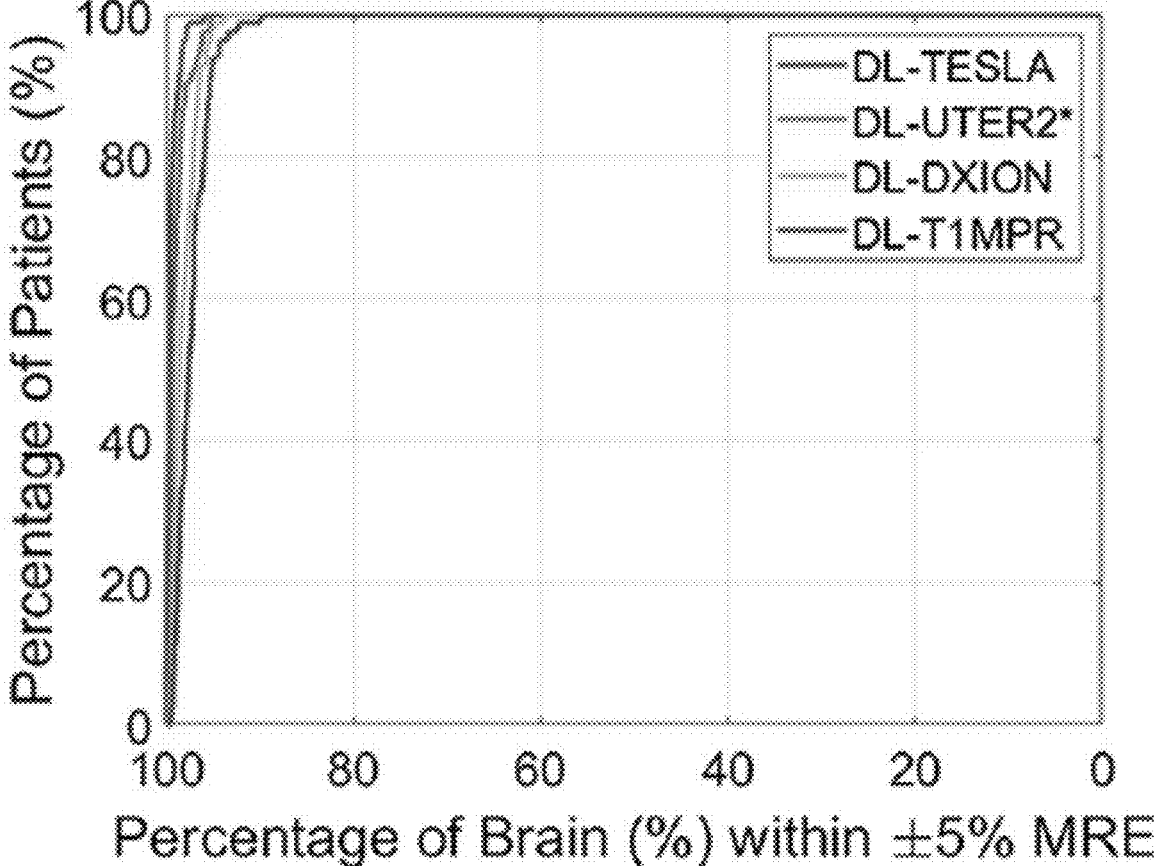
FIG. 13D is a graph summarizing the percentage of patients as a function of various percentages of brain voxels within ±5% MRE.

The percentages of voxels with a PET MRE within ±3% were 98.0%±1.7%, 96.8%±2.0%, 95.0%±2.3%, and 93.6%±3.5% (FIG. 13A) and percentage of voxels within ±5% MRE were 99.5%±0.6%, 99.0%±1.0%, 98.1%±1.2%, and 97.3%±1.7% for DL-TESLA, DL-UTER*, and DL-Dixon, DL-T1MPR, respectively (FIG. 13B). All 4 networks are robust across all testing participants. A total of 98.8%, 98.8%, 96.2%, and 92.9% of all testing participants had >90% brain voxels with a PET MRE within ±3% (FIG. 13A,13C), and 100%, 100%, 100%, and 98.8% of all testing participants had >90% brain voxels with a PET MRE within +5% using DL-TESLA, DL-UTER*, DL-Dixon, and DL-T1MPR networks, respectively (FIG. 13B,13D).

Example 3: Test-Retest Repeatablity of PET AC

To evaluate the repeatability of attenuation coefficients obtained using the the machine learning models described in Example 1, the following experiments were conducted.

Test-retest repeatability analysis was performed on the standardized uptake value ratio (SUVR) in the cerebrum (cerebral gray matter and cerebral white matter) and mean cortical (MC) region. SUVR in MC was calculated as the mean SUVR from 4 regions of interest (ROIs); the prefrontal cortex, precuneus, temporal cortex, and gyrus rectus regions. The test-retest repeatability of the proposed DL-TESLA and CT methods were assessed using the Bland and Altman method. The mean and SD of the PET SUVR percent differences across participants were calculated for PET images reconstructed using CT or MR AC. The within-subject coefficient of variation (wCV) was defined as wCV=SD/√2. The 95% limits of repeatability (LOR) were defined as (mean 1.96×SD, mean+1.96×SD).

Statistical analyses were performed using MATLAB 2019a (The MathWorks, Natick, Mass.) and R 3.6.1 (Foundation for Statistical Computing, Vienna, Austria). Comparisons were performed using a paired t test with the Benjamini-Hochberg procedure to control for false discovery rate (FDR) in multiple comparisons.

The test-retest repeatability between visits 1 and 2 PET SUVR difference using CT (upper row) and visit 1 and 2 DL-TESLA (lower row) estimated CT in the cerebrum and MC ROI were shown in the Bland-Altman plots in FIGS. 11A, 11B, 11C, and 11D. DL-TESLA had similar test-retest SUVR differences as CT in the cerebrum (DL-TESLA=0.62%±1.05% vs. CT=−0.57%±1.02%) and MC (DL-TESLA=−0.65%±1.62% vs. CT=−0.22%±1.00%), respectively. In addition, DL-TESLA also had comparable wCV as CT in both cerebrum (DL-TESLA=0.74% vs. CT=0.72%) and MC (DL-TESLA=1.15% vs. CT=0.71%).

What is claimed is:

1. A system for obtaining a linear attenuation coefficient map based on at least one MR (magnetic resonance) image, the system comprising a computing device with at least one processor and a non-volatile computer-readable memory, the non-volatile computer-readable memory containing a plurality of instructions executable on the at least one processor, the plurality of instructions configured to:

receive the at least one MR image, each MR image comprising an FA1TE1 (flip angle 1, echo time 1) map, an FA2TE2 (flip angle 2, echo time 2) map, and an R1 (longitudinal relaxation rate) map;

transform each MR image into a pseudo-CT (pseudo-computed tomography) map using a machine learning model comprising a DL-TESLA (deep-learning-based T1-enhanced selection of linear attenuation coefficients) model based on the FA1TE1 map, the FA2TE2 map, and the R1 map; and transform the pseudo-CT map into the linear attenuation coefficient map using piecewise linear scaling.

2. The system of claim 1, wherein the DL-TESLA model comprises a 3D residual UNet (ResUNet).

3. The system of claim 1, wherein the piecewise linear scaling is based on empirical relationships between CT HU (computed tomography Hounsfield unit) values and R1 values.

4. The system of claim 1, wherein the plurality of instructions is further configured to transform the pseudo-CT map into an electron density map using piecewise linear scaling.

5. A computer-implemented method for obtaining a linear attenuation coefficient map based on at least one MR (magnetic resonance) image, the method comprising:

receiving, using the computing device, the at least one MR image, each MR image comprising an FA1TE1 (flip angle 1, echo time 1) map, an FA2TE2 (flip angle 2, echo time 2) map, and an R1 (longitudinal relaxation rate) map;

transforming, using the computing device, each MR image into a pseudo-CT (pseudo-computed tomography) map using a machine learning model comprising a DL-TESLA (deep-learning-based T1-enhanced selection of linear attenuation coefficients) model based on the FA1TE1 map, the FA2TE2 map, and the R1 map; and transforming, using the computing device, the pseudo-CT map into the linear attenuation coefficient map using piecewise linear scaling.

6. The method of claim 5, wherein the DL-TESLA model comprises a 3D residual UNet (ResUNet).

7. The method of claim 5, wherein the piecewise linear scaling is based on empirical relationships between CT HU (computed tomography Hounsfield unit) values and R1 values.

8. The method of claim 5, wherein the plurality of instructions is further configured to transform the pseudo-CT map into an electron density map using piecewise linear scaling.

* * * * *